(12) United States Patent
Furukawa et al.

(10) Patent No.: US 9,726,953 B2
(45) Date of Patent: Aug. 8, 2017

(54) ACTIVE MATRIX SUBSTRATE AND LIQUID-CRYSTAL DISPLAY DEVICE

(71) Applicant: Sharp Kabushiki Kaisha, Osaka-shi, Osaka (JP)

(72) Inventors: Tomoo Furukawa, Osaka (JP); Kuniko Maeno, Osaka (JP); Junichi Morinaga, Osaka (JP); Masakatsu Tominaga, Osaka (JP); Katsuya Ogawa, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 370 days.

(21) Appl. No.: 14/394,852

(22) PCT Filed: Mar. 15, 2013

(86) PCT No.: PCT/JP2013/057356
§ 371 (c)(1),
(2) Date: Oct. 16, 2014

(87) PCT Pub. No.: WO2013/157336
PCT Pub. Date: Oct. 24, 2013

(65) Prior Publication Data
US 2015/0062523 A1 Mar. 5, 2015

(30) Foreign Application Priority Data
Apr. 18, 2012 (JP) .................................. 2012-094328

(51) Int. Cl.
G02F 1/136 (2006.01)
G02F 1/1362 (2006.01)

(52) U.S. Cl.
CPC .. *G02F 1/136286* (2013.01); *G02F 1/136213* (2013.01); *G02F 1/136227* (2013.01)

(58) Field of Classification Search
CPC combination set(s) only.
See application file for complete search history.

(56) References Cited

U.S. PATENT DOCUMENTS 6,646,707 B2 11/2003 Noh et al.
7,038,740 B1 5/2006 Katsuya
(Continued)

FOREIGN PATENT DOCUMENTS

JP 06-208131 A 7/1994
JP 2001-033818 A 2/2001
(Continued)

*Primary Examiner* — Jessica M Merlin
*Assistant Examiner* — Mark Teets
(74) *Attorney, Agent, or Firm* — Keating & Bennett, LLP

(57) ABSTRACT

A TFT substrate (10) includes a substrate (10a); a TFT (11) supported by the substrate; a scanning line (12); a signal line (13); a first interlayer insulating layer (15) provided so as to cover the TFT; a pixel electrode (16) electrically connected to a drain electrode (11d) of the TFT; and a transparent storage capacitor electrode (17) provided so as to overlap at least a part of the pixel electrode. At least the first interlayer insulating layer has a contact hole (CH) formed therein through which the pixel electrode is electrically connected to the drain electrode. The scanning line includes a first area (R1) in which the scanning line is branched into two branched lines (12a). The contact hole is located between the two branched lines.

13 Claims, 23 Drawing Sheets

(56) References Cited

U.S. PATENT DOCUMENTS

| | | | |
|---|---|---|---|
| 7,760,302 B2 * | 7/2010 | Mori | G02F 1/134309 |
| | | | 349/106 |
| 7,777,825 B2 | 8/2010 | Noda et al. | |
| 8,279,151 B2 * | 10/2012 | Oke | G02F 1/134363 |
| | | | 257/353 |
| 9,646,523 B2 * | 5/2017 | Kim | G09G 3/18 |
| 9,666,608 B2 * | 5/2017 | Hoka | H01L 27/124 |
| 2002/0021374 A1 * | 2/2002 | Kikkawa | G02F 1/136213 |
| | | | 349/38 |
| 2005/0225708 A1 * | 10/2005 | Oke | G02F 1/134363 |
| | | | 349/139 |
| 2011/0050551 A1 | 3/2011 | Ota et al. | |
| 2012/0138922 A1 | 6/2012 | Yamazaki et al. | |
| 2014/0063396 A1 * | 3/2014 | Lee | G02F 1/136227 |
| | | | 349/43 |
| 2015/0212375 A1 * | 7/2015 | Park | G02F 1/136209 |
| | | | 349/46 |
| 2016/0370678 A1 * | 12/2016 | Ono | G02F 1/136213 |

FOREIGN PATENT DOCUMENTS

| | | |
|---|---|---|
| JP | 2002-182230 A | 6/2002 |
| JP | 2010-091904 A | 4/2010 |
| JP | 2011-053443 A | 3/2011 |
| JP | 2012-134475 A | 7/2012 |

\* cited by examiner (a)  (b)  (c)

ACTIVE MATRIX SUBSTRATE AND LIQUID-CRYSTAL DISPLAY DEVICE

TECHNICAL FIELD

The present invention relates to an active matrix substrate, and more specifically to an active matrix substrate including a thin film transistor and a pixel electrode electrically connected to the thin film transistor. The present invention also relates to a liquid crystal display device including such an active matrix substrate.

BACKGROUND ART

Liquid crystal display devices have features of being thin and consuming low power and thus are in wide use in various fields. Especially, active matrix liquid crystal display devices have high contrast and superb response characteristics and provide high performance, and therefore are used for TVs, monitors and notebook computers. The size of the market of the active matrix liquid crystal display devices has been expanding recently.

An active matrix liquid crystal display device generally includes an active matrix substrate including a thin film transistor (TFT) that acts as a switching element and is provided for each of pixels (the active matrix substrate is also referred to as a "TFT substrate), a counter substrate including a color filter and the like (the counter substrate is also referred to as a "color filter substrate"), and a liquid crystal layer provided between the active matrix substrate and the counter substrate. The liquid crystal layer is supplied with an electric field in accordance with the potential difference between a pixel electrode electrically connected to the TFT and a common electrode, and an alignment state of liquid crystal molecules in the liquid crystal layer is changed by the electric field. Light transmittance of each pixel is controlled utilizing the change in the alignment state, so that display is provided.

Recently, higher definition liquid crystal display devices having a higher resolution have been developed. A high definition liquid crystal display device has difficulty providing a high numerical aperture of a panel. A reason for this is when the resolution is higher, areas that do not contribute to display (i.e., areas that lower the numerical aperture) such as lines, TFTs, light-shielded areas in the vicinity of contact holes and the like are enlarged.

In a liquid crystal display device, each pixel is provided with a storage capacitor that is electrically connected parallel to a liquid crystal capacitance. Generally in a TN (Twisted Nematic) mode or VA (Vertical Alignment) mode liquid crystal display device, at least one of a pair of electrodes that form the storage capacitor is formed of a light blocking material. Electrodes that form the storage capacitor are, for example, extended from a storage capacitor line (or, are a part of the storage capacitor line) or extended from a drain electrode of the TFT. Therefore, in the TN mode or VA mode liquid crystal display device, the storage capacitor also lowers the numerical aperture.

By contrast, there are some display modes in which the storage capacitor does not lower the numerical aperture. For example, a liquid crystal display device of an FFS (Fringe Field Switching) mode, which is a type of lateral electric field mode, has the following structure as disclosed in Patent Document 1. A common electrode is provided on an interlayer insulating layer that covers the TFTs, and pixel electrodes each having a plurality of slits are provided on a dielectric layer that covers the common electrode. The common electrode and the pixel electrodes are both formed of a transparent conductive material. A storage capacitor is formed of the common electrode, a pixel electrode overlapping the common electrode via the dielectric layer, and the dielectric layer provided between the common electrode and the pixel electrode. Therefore, in the FFS mode, the storage capacitor does not lower the numerical aperture. Patent Document 2 discloses a known structure of the FFS mode in which pixel electrodes are provided on an interlayer insulating layer that covers the TFTs, and a common electrode having a plurality of slits is provided on a dielectric layer that covers the pixel electrodes. In this structure also, the storage capacitor does not lower the numerical aperture.

For other display modes, as disclosed in Patent Documents 3 and 4, it is conceivable to provide a transparent storage capacitor electrode in the active matrix substrate so that a transparent storage capacitor is formed of the transparent storage capacitor electrode, a pixel electrode and a dielectric layer (interlayer insulating layer) provided between the transparent storage capacitor electrode and the pixel electrode.

CITATION LIST

Patent Literature

Patent Document 1: Japanese Laid-Open Patent Publication No. 2002-182230
Patent Document 2: Japanese Laid-Open Patent Publication No. 2011-53443
Patent Document 3: Japanese Laid-Open Patent Publication No. 2001-33818
Patent Document 4: Japanese Laid-Open Patent Publication No. 2010-91904

SUMMARY OF INVENTION

Technical Problem

However, in a current situation where the resolution is desired to be further raised, it is difficult to provide a sufficiently high numerical aperture by merely making the transparent storage capacitor transparent, for the following reasons.

In general, as the resolution is raised, the line resistance and the panel load are increased, which increases signal delay in the line. In order to decrease the signal delay, the line resistance needs to be decreased. The line resistance can be decreased by increasing the thickness or the width of the line. However, when the thickness of the line is increased, a step portion formed in a layer above the line is enlarged. In this case, another line provided above the thickened line is easily broken due to the step portion. Since it is not preferable to increase the thickness of the line for this reason, the width of the line needs to be increased although this lowers the numerical aperture. In addition, in the vicinity of the contact hole, the alignment of liquid crystal molecules is disturbed by the step portion, and the disturbance causes light leak. In order to avoid this, the light-shielded area in the vicinity of the contact hole needs to have a certain area size regardless of the resolution. For these reasons, it is difficult to provide a sufficiently high numerical aperture in a high definition liquid crystal display device.

The present invention made in light of the above-described problems has an object of providing a liquid crystal display device that can realize a sufficiently high numerical aperture even when the resolution is high, and an active matrix substrate preferably usable in such a liquid crystal display device.

Solution to Problem

An active matrix substrate in an embodiment according to the present invention includes a substrate; a thin film transistor that is supported by the substrate and includes a semiconductor layer, a gate electrode, a source electrode and a drain electrode; a scanning line electrically connected to the gate electrode of the thin film transistor; a signal line electrically connected to the source electrode of the thin film transistor; a first interlayer insulating layer provided so as to cover the thin film transistor; a pixel electrode electrically connected to the drain electrode of the thin film transistor; and a transparent storage capacitor electrode that is formed of a transparent conductive material and is provided so as to overlap at least a part of the pixel electrode when seen in a direction normal to the substrate. At least the first interlayer insulating layer has a contact hole formed therein through which the pixel electrode is electrically connected to the drain electrode; the scanning line includes a first area in which the scanning line is branched into two branched lines; and the contact hole is located between the two branched lines.

In an embodiment, the scanning line includes the first area and a second area in which the scanning line is not branched into two branched lines, the first area and the second area being located alternately in a direction in which the scanning line extends; and the thin film transistor is located so as to partially overlap the second area of the scanning line.

In an embodiment, the transparent storage capacitor electrode is provided on the first interlayer insulating layer; the active matrix substrate further includes a second interlayer insulating layer provided so as to cover the transparent storage capacitor electrode; the pixel electrode is provided on the second interlayer insulating layer; and the contact hole is formed to pass both of the first interlayer insulating layer and the second interlayer insulating layer.

In an embodiment, a storage capacitor is formed of the pixel electrode, the transparent storage capacitor electrode, and a part of the second interlayer insulating layer that is located between the pixel electrode and the transparent storage capacitor electrode.

In an embodiment, the active matrix substrate further includes a gate insulating layer provided so as to cover the gate electrode. The transparent storage capacitor electrode is provided below the gate insulating layer; and the pixel electrode is provided on the first interlayer insulating layer.

In an embodiment, a storage capacitor is formed of the pixel electrode, the transparent storage capacitor electrode, apart of the gate insulating layer, and a part of the first interlayer insulating layer, the parts being located between the pixel electrode and the transparent storage capacitor electrode.

In an embodiment, the pixel electrode is provided on the first interlayer insulating layer; the active matrix substrate further includes a second interlayer insulating layer provided so as to cover the pixel electrode; and the transparent storage capacitor electrode is provided on the second interlayer insulating layer.

In an embodiment, a storage capacitor is formed of the pixel electrode, the transparent storage capacitor electrode, and a part of the second interlayer insulating layer that is located between the pixel electrode and the transparent storage capacitor electrode.

A liquid crystal display device according to the present invention includes the active matrix substrate having the above-described structure; a counter substrate located so as to face the active matrix substrate; and a liquid crystal layer provided between the active matrix substrate and the counter substrate.

A liquid crystal display device according to the present invention includes the active matrix substrate having the above-described structure; a counter substrate located so as to face the active matrix substrate; and a liquid crystal layer provided between the active matrix substrate and the counter substrate; and provides display in a lateral electric field mode.

In an embodiment, the transparent storage capacitor electrode acts as a common electrode; and the pixel electrode or the transparent storage capacitor electrode has a plurality of slits formed therein.

A liquid crystal display device according to the present invention includes the active matrix substrate having the above-described structure; a counter substrate located so as to face the active matrix substrate; and a liquid crystal layer provided between the active matrix substrate and the counter substrate; and provides display in a vertical alignment mode.

In an embodiment, the counter substrate includes a light blocking layer overlapping at least the contact hole.

Advantageous Effects of Invention

Embodiments of the present invention provide a liquid crystal display device that can realize a sufficiently high numerical aperture even when the resolution is high, and an active matrix substrate preferably usable in such a liquid crystal display device.

DESCRIPTION OF EMBODIMENTS

Hereinafter, embodiments according to the present invention will be described with reference to the drawings. The present invention is not limited to the following embodiments.

Embodiment 1

Figure 1:
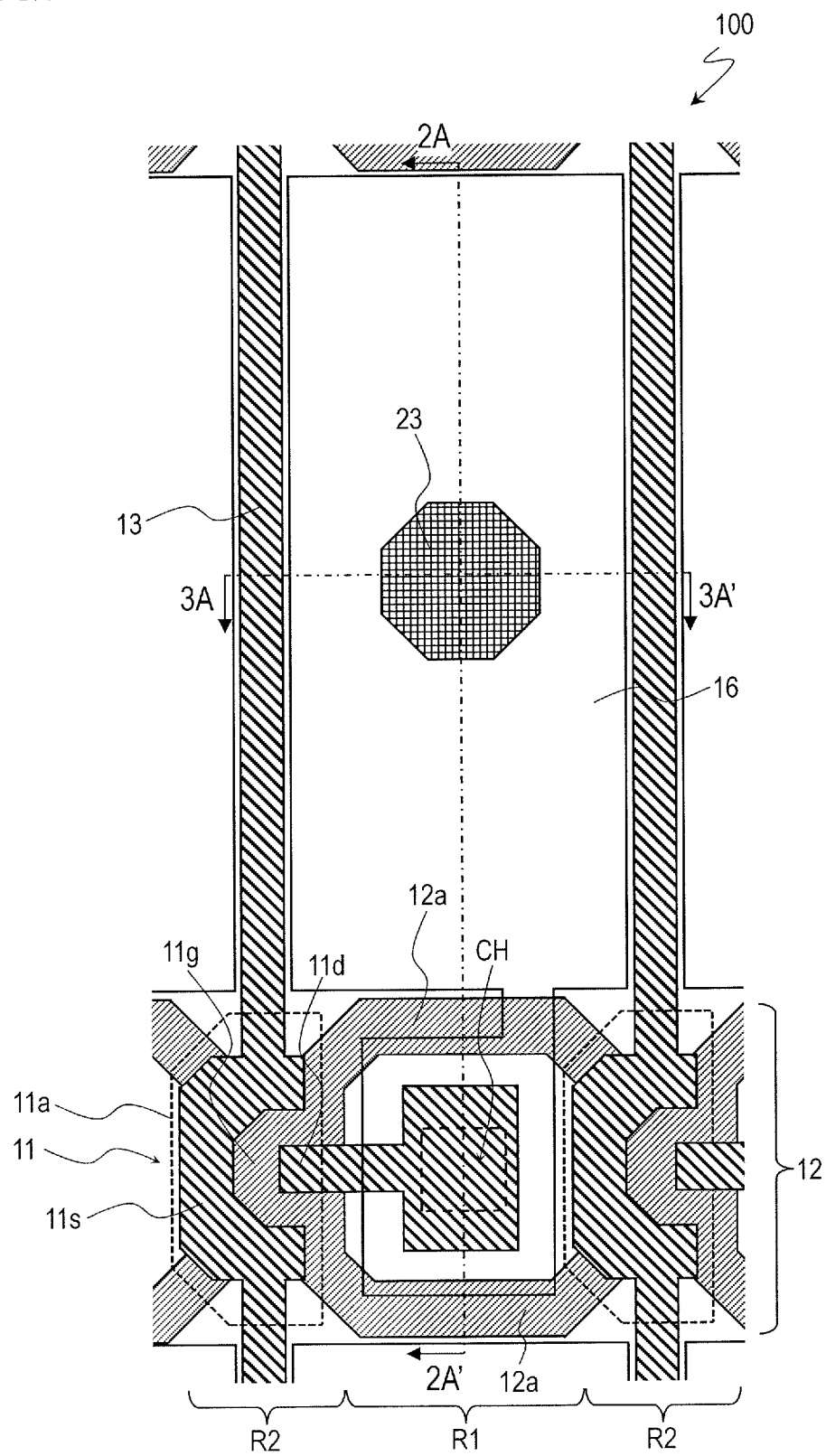
FIG. 1 schematically shows a liquid crystal display device 100 in Embodiment 1 according to the present invention and is a plan view showing an area corresponding to one pixel of the liquid crystal display device 100.
Figure 2:
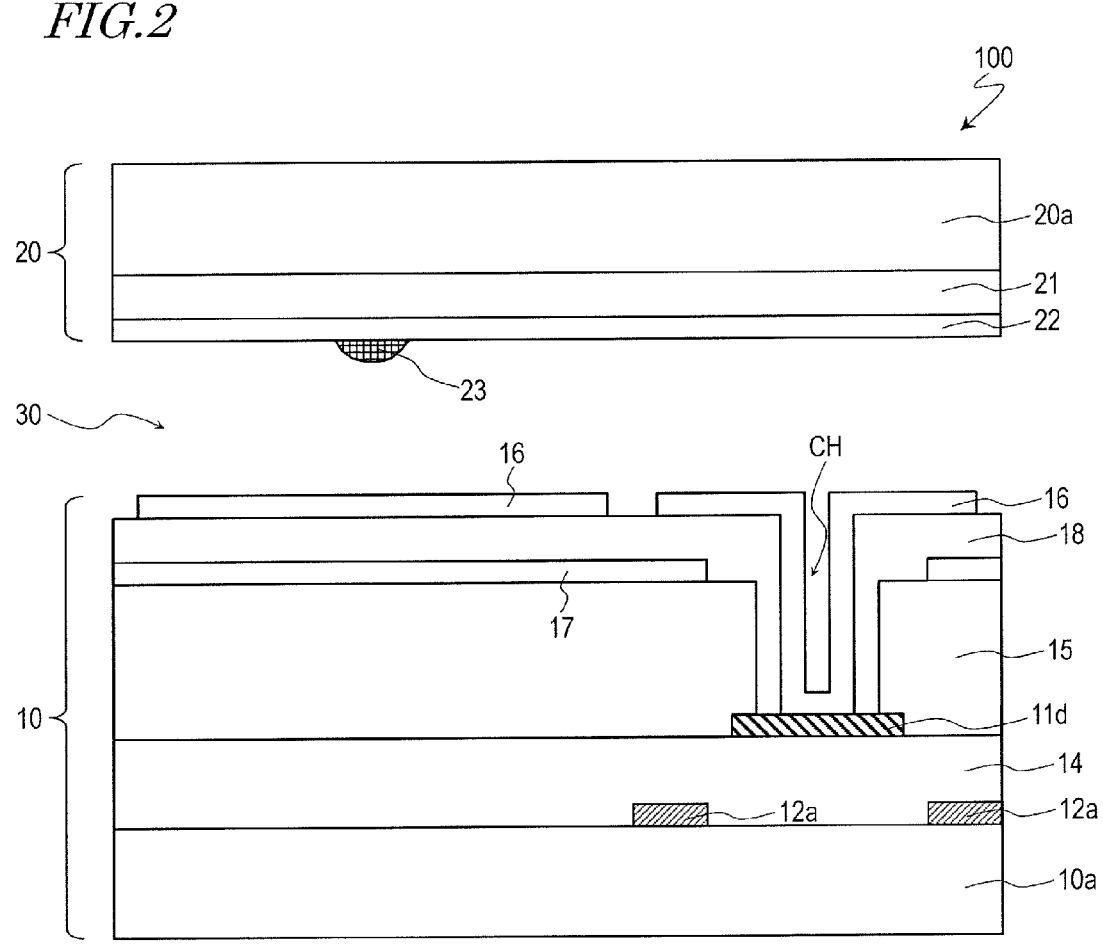
FIG. 2 schematically shows the liquid crystal display device 100 in Embodiment 1 according to the present invention and is a cross-sectional view taken along line 2A-2A' in FIG. 1.
Figure 3:
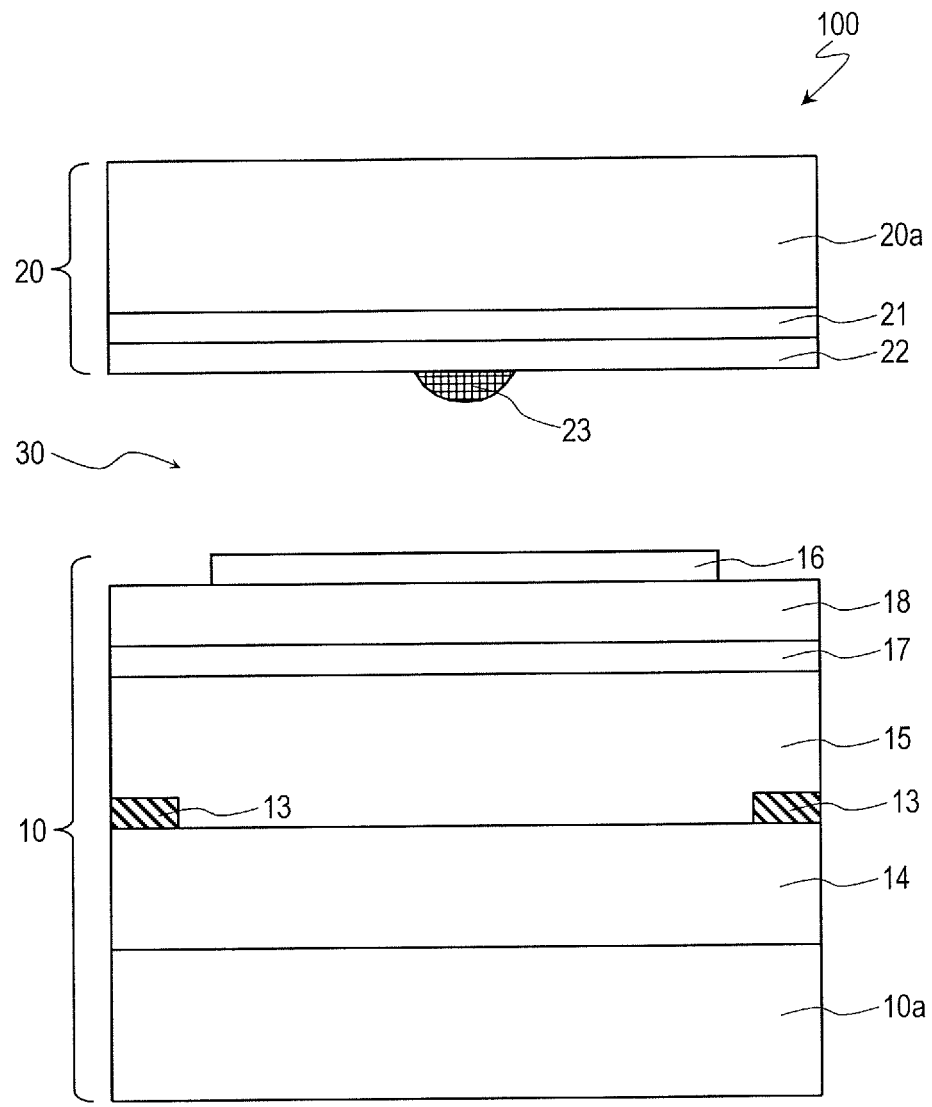
FIG. 3 schematically shows the liquid crystal display device 100 in Embodiment 1 according to the present invention and is a cross-sectional view taken along line 3A-3A' in FIG. 1.

FIG. 1, FIG. 2 and FIG. 3 show a liquid crystal display device 100 in this embodiment. The liquid crystal display device 100 includes a plurality of pixels arrayed in a matrix including a plurality of rows and a plurality of columns. FIG. 1 is a plan view schematically showing an area corresponding to one of pixels in the liquid crystal display device 100. FIG. 2 is a cross-sectional view taken along line 2A-2A' in FIG. 1. FIG. 3 is a cross-sectional view taken along line 3A-3A' in FIG. 1.

The liquid crystal display device 100 provides display in a vertical alignment (VA) mode. More specifically, the liquid crystal display device 100 provides display in a CPA (Continuous Pinwheel Alignment) mode, which is a type of the VA mode. As shown in FIG. 2 and FIG. 3, the liquid crystal display device 100 includes an active matrix substrate (hereinafter, referred to as a "TFT substrate") 10, a counter substrate (occasionally referred to also as a "color filter substrate") 20 located so as to face the TFT substrate 10, and a liquid crystal layer 30 provided between the TFT substrate 10 and the counter substrate 20.

As shown in FIG. 1, FIG. 2 and FIG. 3, the TFT substrate 10 includes a substrate 10a, a thin film transistor (TFT) 11, a scanning line 12 and a signal line 13.

The substrate 10a is transparent and insulating. The substrate 10a is typically a glass substrate.

The TFT 11 is supported by the substrate 10a. The TFT 11 includes a semiconductor layer 11a, a gate electrode 11g, a source electrode 11s, and a drain electrode 11d. The TFT 11 is a so-called bottom gate-type TFT in this embodiment, but alternatively may be a top gate-type TFT.

The scanning line (occasionally referred to also as a "gate bus line") 12 extends generally parallel to a row direction (horizontal direction). The scanning line 12 is electrically connected to the gate electrode 11g of the TFT 11 and supplies a scanning signal to the TFT 11.

The signal line (occasionally referred to also as a "source bus line") 13 extends generally parallel to a column direction (vertical direction). The scanning line 13 is electrically connected to the source electrode 11s of the TFT 11 and supplies a display signal to the TFT 11.

The scanning line 12 and the gate electrode 11g of the TFT 11 described above are provided on a surface of the substrate 10a that faces the liquid crystal layer 30. In this embodiment, a part of the scanning line 12 acts as the gate electrode 11g. A gate insulating layer 14 is provided so as to cover the scanning line 12 and the gate electrode 11g.

On the gate insulating layer 14, the semiconductor layer 11a acting as a channel region, a source region and a drain region of the TFT 11 is provided. The semiconductor layer 11a may be formed of any of various known semiconductor materials, for example, amorphous silicon, polycrystalline silicon, continuous grain silicon (CGS) or the like.

Alternatively, the semiconductor layer 11a may be an oxide semiconductor layer. The oxide semiconductor layer includes, for example, an In—Ga—Zn—O-based semiconductor. The In—Ga—Zn—O-based semiconductor is a three-component oxide containing In (indium), Ga (gallium) and Zn (zinc). The ratio (composition ratio) of In, Ga and Zn is not specifically limited to any ratio, and may be, for example, In:Ga:Zn=2:2:1, In:Ga:Zn=1:1:1, In:Ga:Zn=1:1:2 or the like. The In—Ga—Zn—O-based semiconductor may be amorphous or crystalline. In a preferable crystalline In—Ga—Zn—O-based semiconductor, c axis is aligned generally vertically to the layer surface. A crystalline structure of such an In—Ga—Zn—O-based semiconductor is disclosed in, for example, Japanese Laid-Open Patent Publication No. 2012-134475. The entirety of Japanese Laid-Open Patent Publication No. 2012-134475 is incorporated therein by reference. A TFT including an In—Ga—Zn—O-based semiconductor layer has high mobility (more than 20 times the mobility of an a-Si TFT) and low leak current (less than $1/100$ of the leak current of an a-Si TFT).

The oxide semiconductor layer is not limited to an In—Ga—Zn—O-based semiconductor layer. The oxide semiconductor layer may contain, for example, a Zn—O-based semiconductor (ZnO), an In—Zn—O-based semiconductor (IZO), a Zn—Ti—O-based semiconductor (ZTO), a Cd—Ge—O-based semiconductor, a Cd—Pb—O-based semiconductor, an In—Sn—Zn—O-based semiconductor (e.g., $In_2O_3$—$SnO_2$—ZnO), an In—Ga—Sn—O-based semiconductor or the like.

The source electrode 11s and the drain electrode 11d are provided so as to respectively contact the source region and the drain region of the semiconductor layer 11a. The signal line 13 is also provided on the gate insulating layer 14.

The TFT substrate 10 further includes a first interlayer insulating layer 15 provided so as to cover the TFT 11, a pixel electrode 16 electrically connected to the drain electrode 11d of the TFT 11, and a transparent storage capacitor electrode 17 formed of a transparent conductive material.

The first interlayer insulating layer 15 may include a single layer or may have a stacking structure including a plurality of insulating films (e.g., a stacking structure including an inorganic insulating film and an organic insulating film).

In this embodiment, the transparent storage capacitor electrode 17 is provided on the first interlayer insulating layer 15. The transparent storage capacitor electrode 17 is provided so as to overlap at least apart of (in this example, substantially the entirety of) the pixel electrode 16 when seen in a direction normal to the substrate 10a. The transparent storage capacitor electrode 17 is formed of, for example, ITO.

A second interlayer insulating layer (dielectric layer) 18 is provided so as to cover the transparent storage capacitor electrode 17. The pixel electrode 16 is provided on the second interlayer insulating layer 18. The pixel electrode 16 is also formed of a transparent conductive material (e.g., ITO). A storage capacitor is formed of the pixel electrode 16, the transparent storage capacitor electrode 17, and a part of the second interlayer insulating layer 18 that is located between the pixel electrode 16 and the transparent storage capacitor electrode 17. The transparent storage capacitor electrode 17 is supplied with a storage capacitor voltage (Cs voltage) that is different from the voltage supplied to the pixel electrode 16. As the Cs voltage, a voltage that is the same as the voltage supplied to a counter electrode 22 (described later) is supplied.

The first interlayer insulating layer 15 has a contact hole CH formed therein through which the pixel electrode 16 is electrically connected to the drain electrode 11d of the TFT 11. In this embodiment, the pixel electrode 16 is provided on the second interlayer insulating layer 18. Therefore, the contact hole CH is formed in the first interlayer insulating layer 15 and also in the second interlayer insulating layer 18 (namely, the contact hole CH pass both of the first interlayer insulating layer 15 and the second interlayer insulating layer 18). In the contact hole CH, the pixel electrode 16 is connected to the drain electrode 11d. The transparent storage capacitor electrode 17 is continuously formed to expand through all the pixels except for an area in the vicinity of the contact holes CH.

The counter substrate 20 includes a substrate 20a, a color filter layer 21 and the counter electrode 22.

The substrate 20a is transparent and insulating. The substrate 20a is typically a glass substrate.

The color filter layer 21 includes a color filter in accordance with the color to be displayed in each pixel (e.g., a red color filter, a green color filter or a blue color filter) and a light blocking layer (black matrix). The light blocking layer is located so as to overlap the TFT 11, the scanning line 12 and the signal line 13. The light blocking layer is located so as to overlap also the contact hole CH.

The counter electrode 22 is provided so as to face the pixel electrode 16. Typically, the counter electrode 22 is a common electrode that is common for all the pixels in a display area. When necessary, a flattening layer may be provided between the color filter layer 21 and the counter electrode 22.

The counter substrate 20 also includes a protrusion 23 provided in an area corresponding to the substantially central position of each pixel (the substantially central position of each pixel electrode 16). The protrusion (occasionally referred to as a "rivet") 23 is formed of, for example, a photosensitive resin.

The liquid crystal layer 30 is of a vertical alignment type. Liquid crystal molecules in the liquid crystal layer 30 have negative dielectric anisotropy, and are aligned generally vertically (typically, so as to have an angle of 85° or greater) with respect to the surfaces of the substrates in the absence of a voltage. On surfaces of the TFT substrate 10 and the counter substrate 20 that face the liquid crystal layer 30, a pair of vertical alignment films are respectively provided.

When a voltage is applied to the liquid crystal layer 30, one liquid crystal domain, in which the liquid crystal molecules are aligned in an axially symmetrical manner, is formed in each pixel by an alignment regulating force of an oblique electric field that is generated in the vicinity of an outer edge of the pixel electrode 16 and an alignment regulating force of the protrusion 23. In the liquid crystal domain, the liquid crystal molecules are aligned in a tilted state and radially as being centered around the protrusion 23. In this embodiment, the protrusion 23 is shown as an example. Alternatively, a column-like spacer that defines a cell gap may be used to regulate the alignment instead of having the protrusion 23 thereon. Still alternatively, the counter electrode 22 may have an opening instead of having the protrusion 23 thereon. In the case where the column-like space is used to regulate the alignment, it is preferable that the light blocking layer is located so as to overlap also the column-like spacer because the liquid crystal molecules in the vicinity of the column-like spacer may cause light leak.

As described above, in the liquid crystal display device 100 in this embodiment, the TFT substrate 10 includes the transparent storage capacitor electrode 17, and a storage capacitor is formed of the pixel electrode 16, the transparent storage capacitor electrode 17, and a part of the second interlayer insulating layer 18 that is located between the pixel electrode 16 and the transparent storage capacitor electrode 17. Therefore, the storage capacitor is transparent and does not decrease the numerical aperture.

The liquid crystal display device 100 in this embodiment has the following structure and thus can further raise the numerical aperture while suppressing signal delay.

In this embodiment, as shown in FIG. 1, the scanning line 12 includes a first area R1 in which the scanning line 12 is branched into two branched lines 12a and a second area R2 in which the scanning line 12 is not branched. Such first areas R1 and such second areas R2 are located alternately in a direction in which the scanning line 12 extends. The contact hole CH is located between the two branched lines 12a. The TFT 11 is located so as to at least partially overlap the second area R2 of the scanning line 12. Namely, the TFT 11 is formed at a position where the scanning line 12 is branched.

As described above, in the liquid crystal display device 100 in this embodiment, the scanning line 12 includes the first area R1 in which the scanning line 12 is branched into the two branched lines 12a. Therefore, the scanning line 12 has a decreased line resistance so that signal delay can be suppressed. In addition, the contact hole CH through which the pixel electrode 16 is electrically connected to the drain electrode 11d is located between the two branched lines 12a of the scanning line 12. Therefore, a region of the light blocking layer that is for blocking light against the scanning line 12 can also block light against an area in the vicinity of the contact hole CH. In other words, a region of the light blocking layer that blocks light against the area in the vicinity of the contact hole CH, where the alignment is disturbed, covers an area extending between edges of the branched lines 12a. Therefore, the ratio of the area that does not contribute to display can be decreased in each pixel (namely, the area that does not contribute to display can be located in a concentrated manner). This can further raise the numerical aperture.

By contrast, in a conventional liquid crystal display device, in order to decrease signal delay in a scanning line down to a level equivalent to that of the liquid crystal display device 100 in this embodiment, the following is necessary. The width of the scanning line needs to be twice as large as the width of each branched line 12a in the liquid crystal display device 100 in this embodiment. The contact hole needs to be formed in an area different from the area where the scanning line extends. The light blocking layer needs to include a region for blocking light against the area in the vicinity of the contact hole, separately from a region for blocking light against the signal line. In such a structure, the ratio of the area that does not contribute to display is higher than in the liquid crystal display device 100 in this embodiment, and thus a sufficiently high numerical aperture cannot be realized.

As described above, the liquid crystal display device 100 in this embodiment can raise the numerical aperture to a sufficiently high level while suppressing signal delay, which is caused by an increase in the line resistance. In a conventional liquid crystal display device, it is difficult to provide a sufficiently high numerical aperture while decreasing signal delay, which is caused by an increase in the display size and in the resolution. The structure as in this embodiment can realize a sufficiently high numerical aperture even when a liquid crystal display device is made larger and the resolution thereof is raised.

Now, specific advantages of the liquid crystal display device 100 in this embodiment will be described as compared with liquid crystal display devices in comparative examples.

Figure 4:
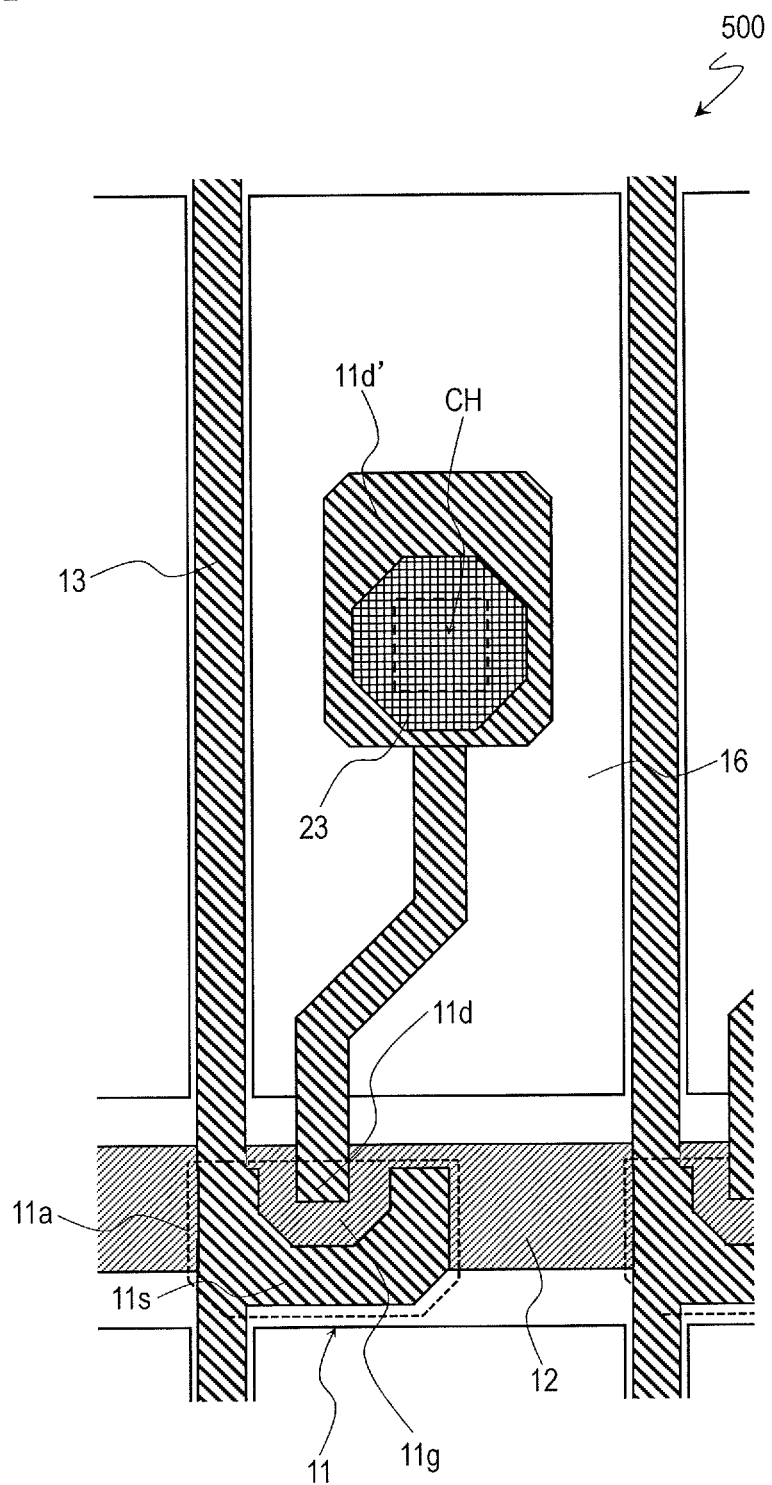
FIG. 4 schematically shows a liquid crystal display device 500 in comparative example 1 and is a plan view showing an area corresponding to one pixel of the liquid crystal display device 500.
Figure 5:
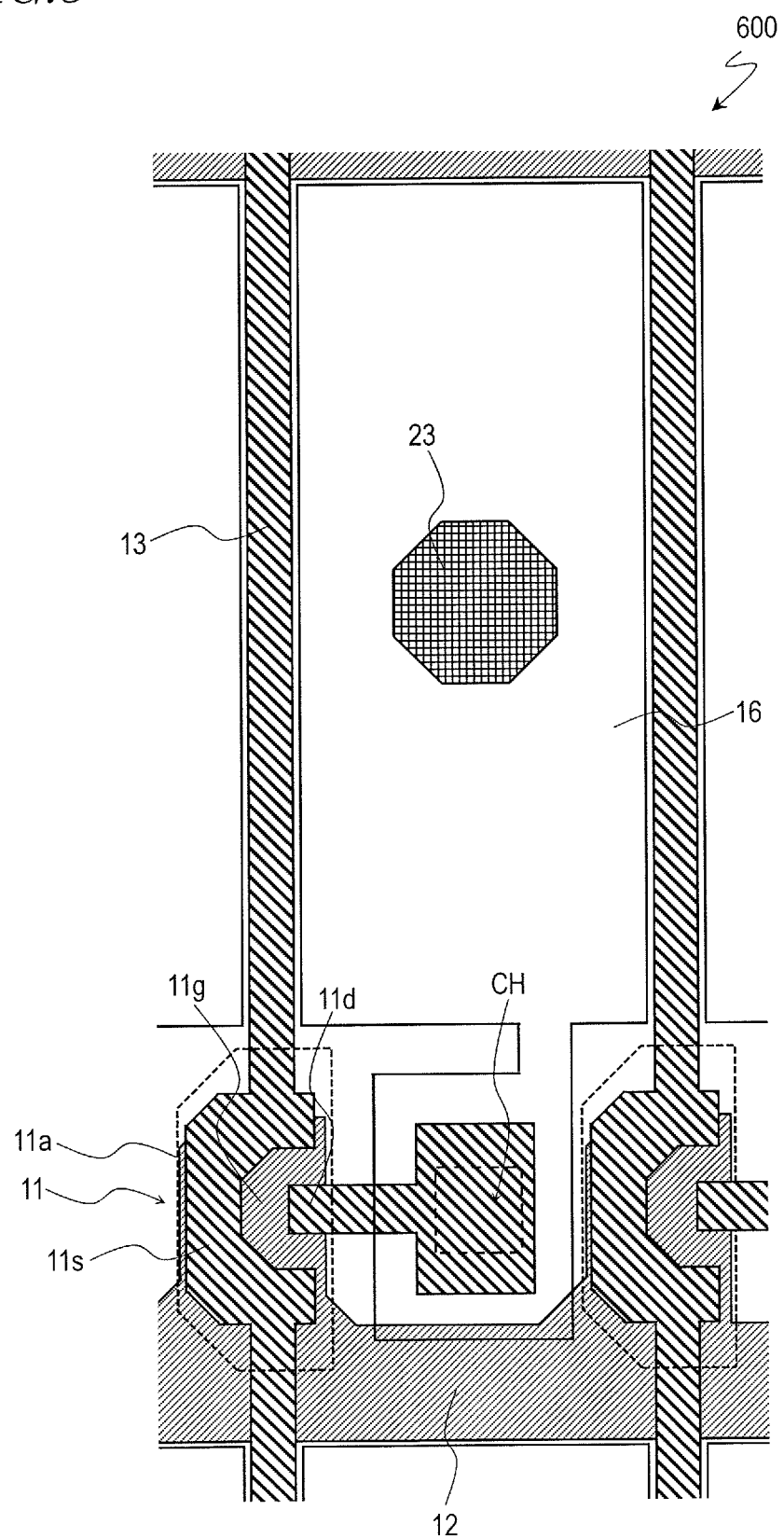
FIG. 5 schematically shows a liquid crystal display device 600 in comparative example 2 and is a plan view showing an area corresponding to one pixel of the liquid crystal display device 600.

FIG. 4 and FIG. 5 respectively show liquid crystal display devices 500 and 600 in comparative examples 1 and 2. In the liquid crystal display devices 500 and 600 in comparative examples 1 and 2 shown in FIG. 4 and FIG. 5, the scanning line 12 is not branched, unlike in the liquid crystal display device 100 in this embodiment. In the liquid crystal display device 500 in comparative example 1, a connection electrode 11d' extending from the drain electrode 11d extends to the substantially central position of the pixel, and the contact hole CH is located at the substantially central position of the pixel, unlike in the liquid crystal display device 100.

Figure 6:
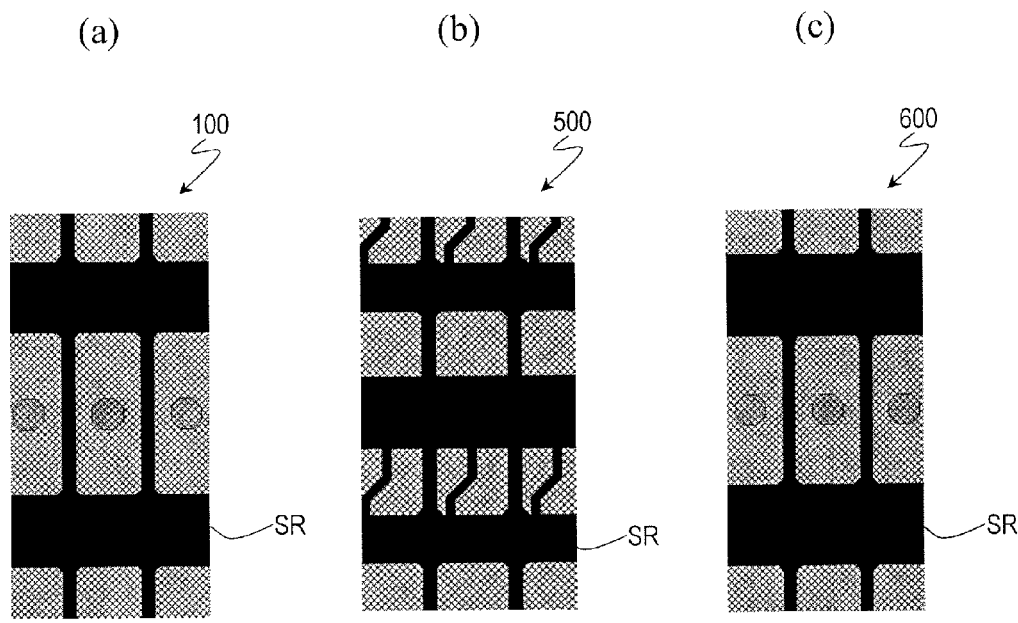
FIGS. 6(*a*), (*b*) and (*c*) respectively show areas SR shielded from light by a light blocking layer in the liquid crystal display device 100 in Embodiment 1 and the liquid crystal display devices 500 and 600 in comparative examples 1 and 2.

FIGS. 6(a), (b) and (c) respectively show areas SR shielded from light by the light blocking layer in the liquid crystal display device 100 in this embodiment and the liquid crystal display devices 500 and 600 in comparative examples 1 and 2.

As can be seen from comparison among FIGS. 6(a), (b) and (c), the ratio of the area SR shielded from light is smaller and a higher numerical aperture is realized in the liquid crystal display device 100 in this embodiment than in the liquid crystal display devices 500 and 600 in comparative examples 1 and 2.

Table 1 below shows an example of numerical aperture values of the liquid crystal display device 100 in this embodiment (Embodiment 1), the liquid crystal display device 600 in comparative example 2, and a conventional liquid crystal display device including an opaque storage capacitor. The pixel size is adjusted to be substantially the same in all the liquid crystal display devices. In the liquid crystal display device 100 in this embodiment and the liquid crystal display device 600 in comparative example 2, the storage capacitor electrode is the transparent storage capacitor electrode 17 foisted of a transparent conductive material. By contrast, in the conventional liquid crystal display device, the storage capacitor electrode is an opaque storage capacitor electrode formed of a metal material.

TABLE 1

|  | Embodiment 1 | Comparative example 2 | Conventional |
|---|---|---|---|
| Storage capacitor electrode | Transparent storage capacitor electrode | Transparent storage capacitor electrode | Opaque storage capacitor electrode formed of a metal material |
| Numerical aperture | 1.00 | 0.93 | 0.70 |

As can be seen from Table 1, where the numerical aperture of the liquid crystal display device 100 in this embodiment is 1.00, the numerical aperture of the liquid crystal display device 600 in comparative example 2 is 0.93 and the numerical aperture of the conventional liquid crystal display device is 0.70. Thus, the numerical aperture of the liquid crystal display device 100 in this embodiment is raised by 7.5% as compared with that of the liquid crystal display device 600 in comparative example 2 and is raised by 42.4% as compared with that of the conventional liquid crystal display device.

The degree of rise in the numerical aperture varies in accordance with the pixel size. As the resolution of the liquid crystal display device 100 is higher, namely, as the pixel size is smaller, the degree of rise in the numerical aperture is higher, namely, the effect provided by adopting the structure as in this embodiment is more conspicuous.

In the structure shown in this example, the transparent storage capacitor electrode 17 is provided on the first interlayer insulating layer 15, and a storage capacitor is formed of the pixel electrode 16, the transparent storage capacitor electrode 17, and a part of the second interlayer insulating layer 18 that is located between the pixel electrode 16 and the transparent storage capacitor electrode 17. The location of the transparent storage capacitor electrode 17 and the structure of the storage capacitor are not limited to those shown here.

Figure 7:
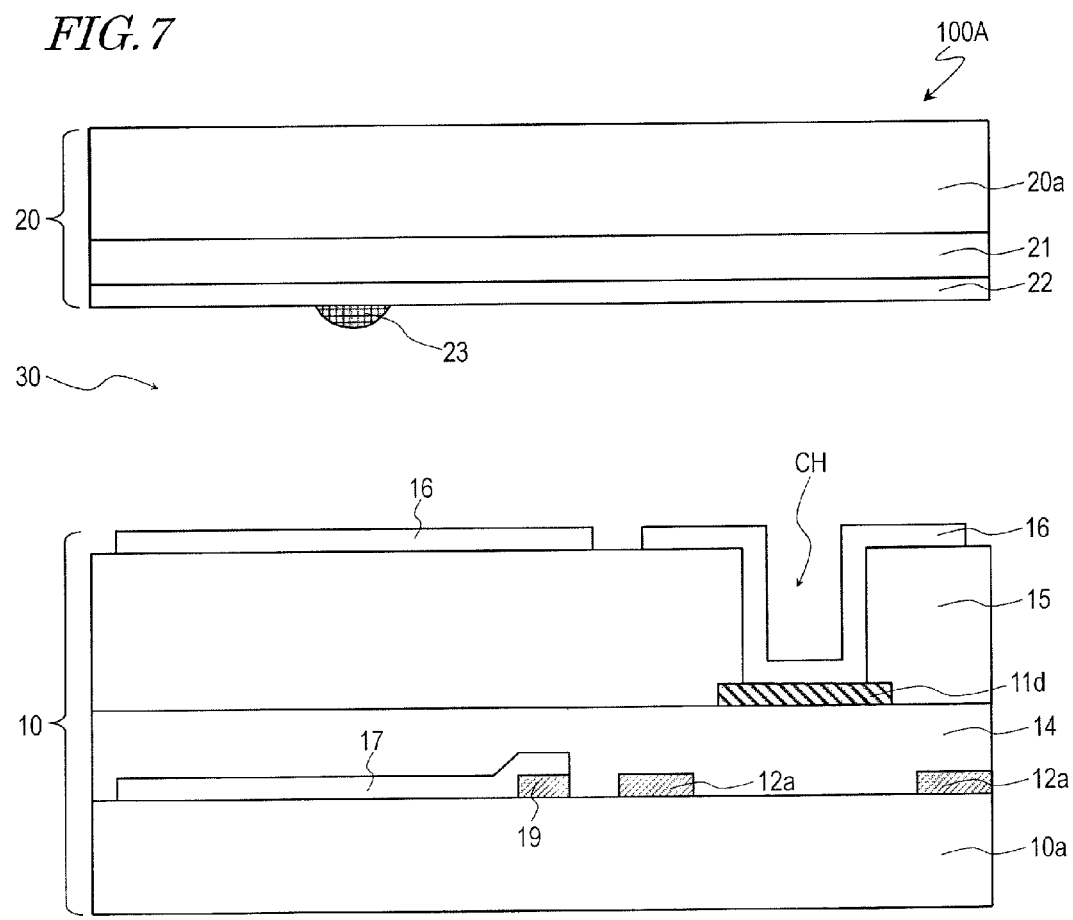
FIG. 7 schematically shows another liquid crystal display device 100A in Embodiment 1 according to the present invention and is a cross-sectional view corresponding to FIG. 2 provided for the liquid crystal display device 100.
Figure 8:
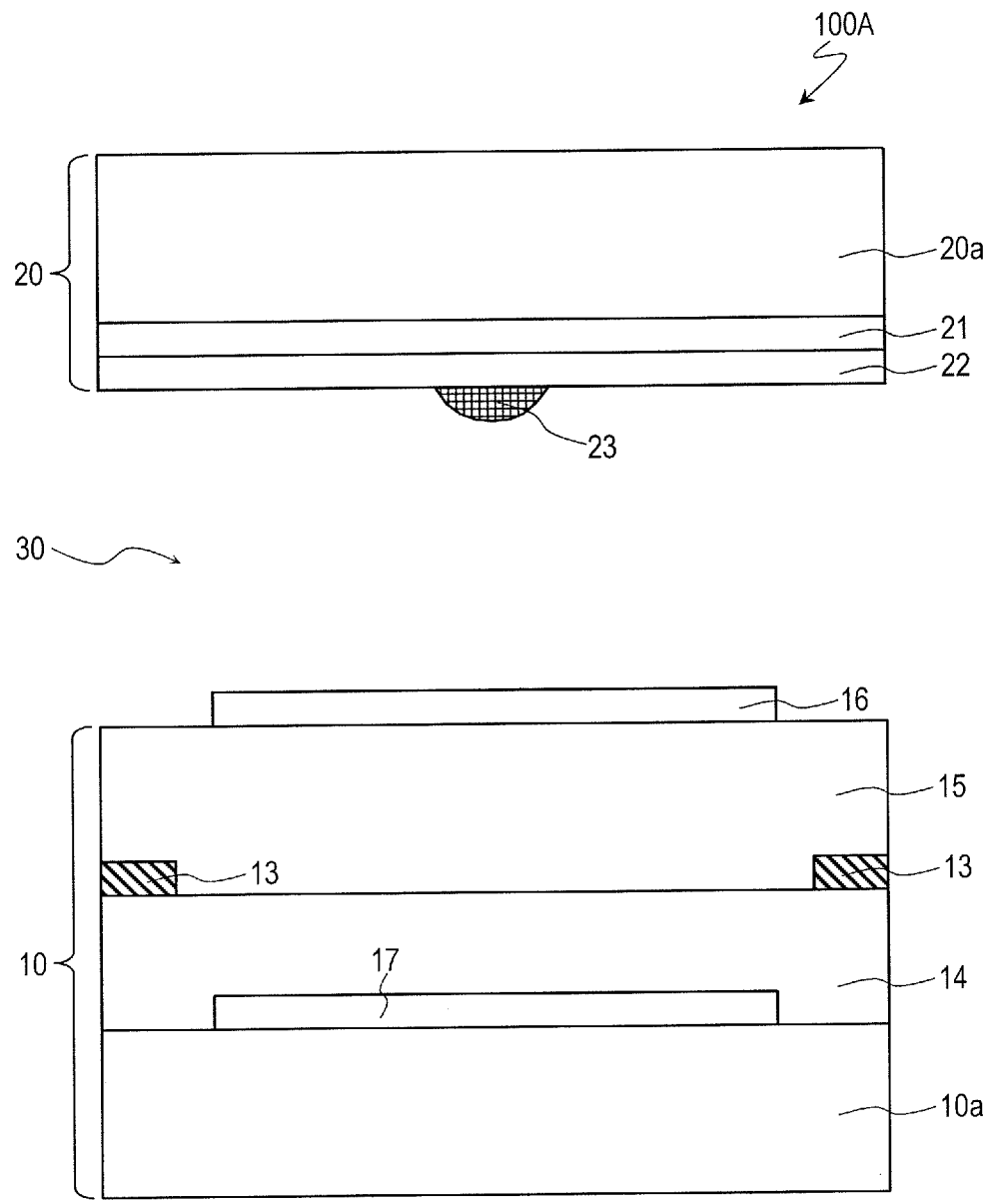
FIG. 8 schematically shows the another liquid crystal display device 100A in Embodiment 1 according to the present invention and is a cross-sectional view corresponding to FIG. 3 provided for the liquid crystal display device 100.

FIG. 7 and FIG. 8 each show another liquid crystal display device 100A in this embodiment. FIG. 7 and FIG. 8 are each a cross-sectional view schematically showing the liquid crystal display device 100A and respectively correspond to FIG. 2 and FIG. 3 provided for the liquid crystal display device 100.

In the liquid crystal display device 100A shown in FIG. 7 and FIG. 8, the transparent storage capacitor electrode 17 is provided below the gate insulating layer 14, and the pixel electrode 16 is provided on the first interlayer insulating layer 15. In this structure, a storage capacitor is formed of the pixel electrode 16, the transparent storage capacitor electrode 17, a part of the gate insulating layer 14, and a part of the first layer insulating layer 15, the parts being located between the pixel electrode 16 and the transparent storage capacitor electrode 17.

The transparent storage capacitor electrode 17 is electrically connected to a storage capacitor line 19 and is supplied with a Cs voltage from the storage capacitor line 19. The storage capacitor line 19 is formed of the same conductive film as that of the scanning line 12. A reason why the transparent storage capacitor electrode 17 is electrically connected to the storage capacitor line 19 is that in the case where the transparent storage capacitor electrode 17 is provided below the gate insulating layer 14, the transparent storage capacitor electrode 17 is patterned so as not to be continuous to expand through all the pixels.

The liquid crystal display device 100A shown in FIG. 7 and FIG. 8 also provides an effect of raising the numerical aperture to a sufficiently high level while suppressing signal delay, which is caused by an increase in the line resistance.

In the structure as in the liquid crystal display device 100 shown in FIG. 2 and FIG. 3, the transparent storage capacitor electrode 17 is located between the scanning line 12/signal line 13 and the pixel electrode 16. Therefore, an electric field formed by a voltage supplied to the scanning line 12 or the signal line 13 can be electrically shielded by the transparent storage capacitor electrode 17. This provides an effect that display can be prevented from being adversely influenced by the potential of the scanning line 12 or the signal line 13.

In this embodiment, one liquid crystal domain is formed in each pixel when a voltage is applied. The number of the liquid crystal domain is not limited to one. A plurality of liquid crystal domains may be formed in each pixel when a voltage is applied. In the case where a plurality of liquid crystal domains are formed, the pixel electrode 16 has at least one opening and/or a cutout portion formed therein so that the pixel electrode 16 is divided into a plurality of sub electrodes (each corresponds to one liquid crystal domain) by the opening or the cutout portion. However, it should be noted that the effect of raising the numerical aperture provided by using the structure as in this embodiment is exhibited more conspicuously in the case where the pixel size is relatively small so that only one liquid crystal domain is formed stably in each pixel.

Embodiment 2

Figure 9:
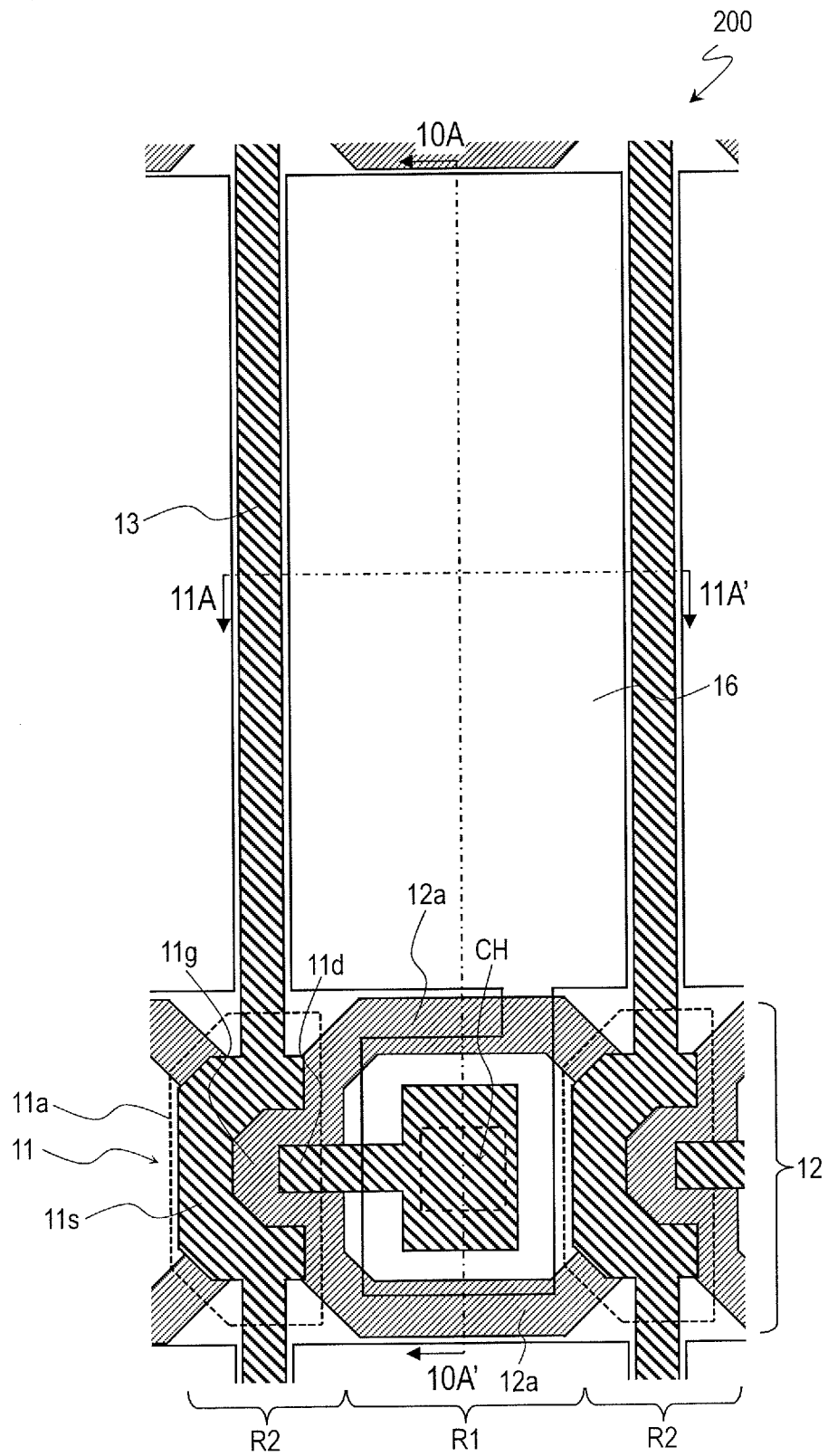
FIG. 9 schematically shows a liquid crystal display device 200 in Embodiment 2 according to the present invention and is a plan view showing an area corresponding to one pixel of the liquid crystal display device 200.
Figure 10:
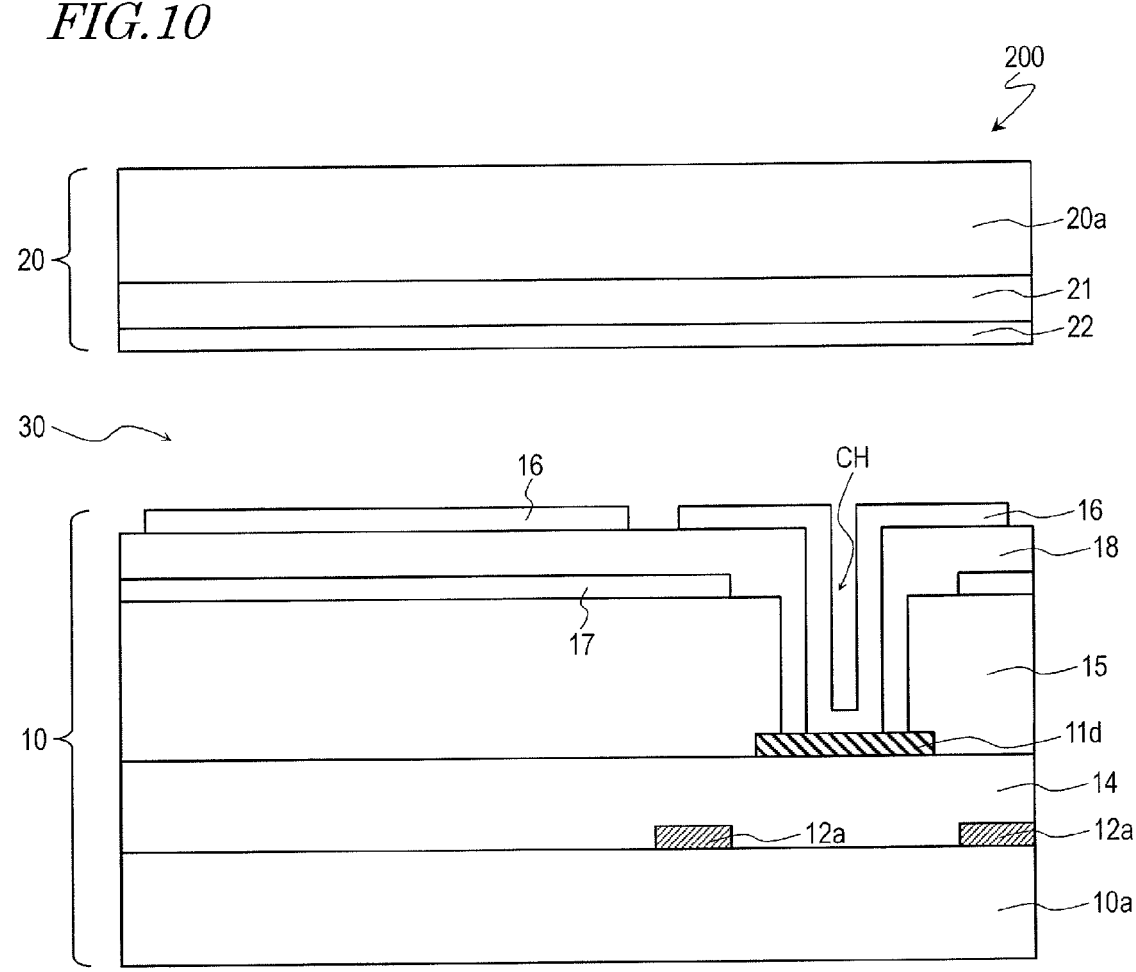
FIG. 10 schematically shows the liquid crystal display device 200 in Embodiment 2 according to the present invention and is a cross-sectional view taken along line 10A-10A' in FIG. 9.
Figure 11:
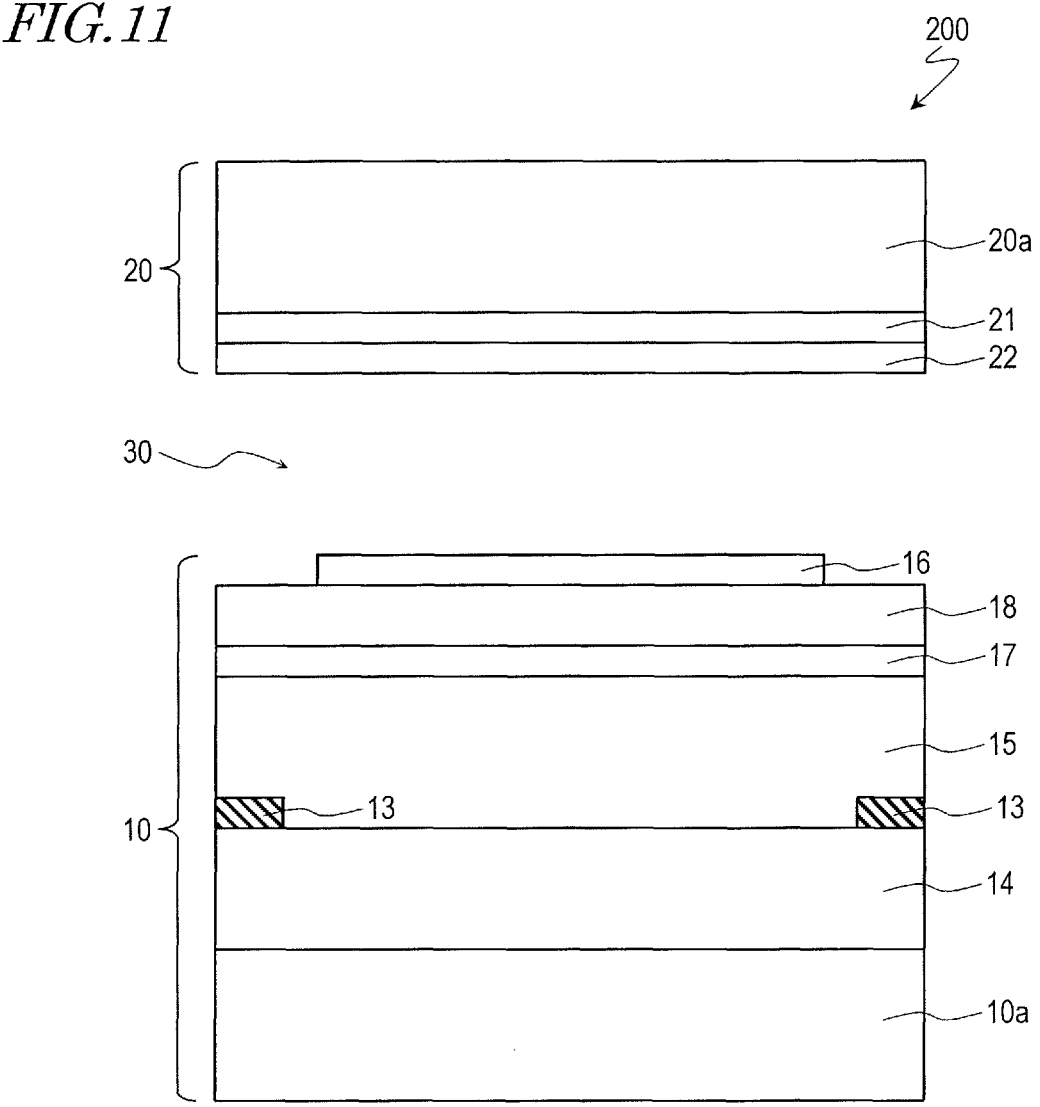
FIG. 11 schematically shows the liquid crystal display device 200 in Embodiment 2 according to the present invention and is a cross-sectional view taken along line 11A-11A' in FIG. 9.

FIG. 9, FIG. 10 and FIG. 11 show a liquid crystal display device 200 in this embodiment. FIG. 9 is a plan view schematically showing an area corresponding to one of pixels in the liquid crystal display device 200. FIG. 10 is a cross-sectional view taken along line 10A-10A' in FIG. 9. FIG. 11 is a cross-sectional view taken along line 11A-11A' in FIG. 9.

The liquid crystal display device 100 in Embodiment 1 provides display in the CPA mode, whereas the liquid crystal display device 200 in this embodiment provides display in a TN mode (or an ECB mode). Therefore, the counter substrate 20 of the liquid crystal display device 200 does not include the protrusion 23. On the surfaces of the TFT substrate 10 and the counter substrate 20 that face the liquid crystal layer 30 in the liquid crystal display device 200, alignment films of a type in accordance with the display mode are provided. The alignment films are, for example, rubbed to define alignment directions of the liquid crystal molecules.

In the liquid crystal display device 200 in this embodiment also, the TFT substrate 10 includes the transparent storage capacitor electrode 17, and a storage capacitor is formed of the pixel electrode 16, the transparent storage capacitor electrode 17, and a part of the second interlayer insulating layer 18 that is located between the pixel electrode 16 and the transparent storage capacitor electrode 17. Therefore, the storage capacitor is transparent and does not decrease the numerical aperture.

The scanning line 12 includes the first area R1 in which the scanning line 12 is branched into the two branched lines 12a, and the contact hole CH through which the pixel electrode 16 is electrically connected to the drain electrode 11d is located between the two branched lines 12a. Therefore, the numerical aperture can be further raised while signal delay is suppressed.

Now, specific advantages of the liquid crystal display device 200 in this embodiment will be described as compared with a liquid crystal display device in a comparative example.

Figure 12:
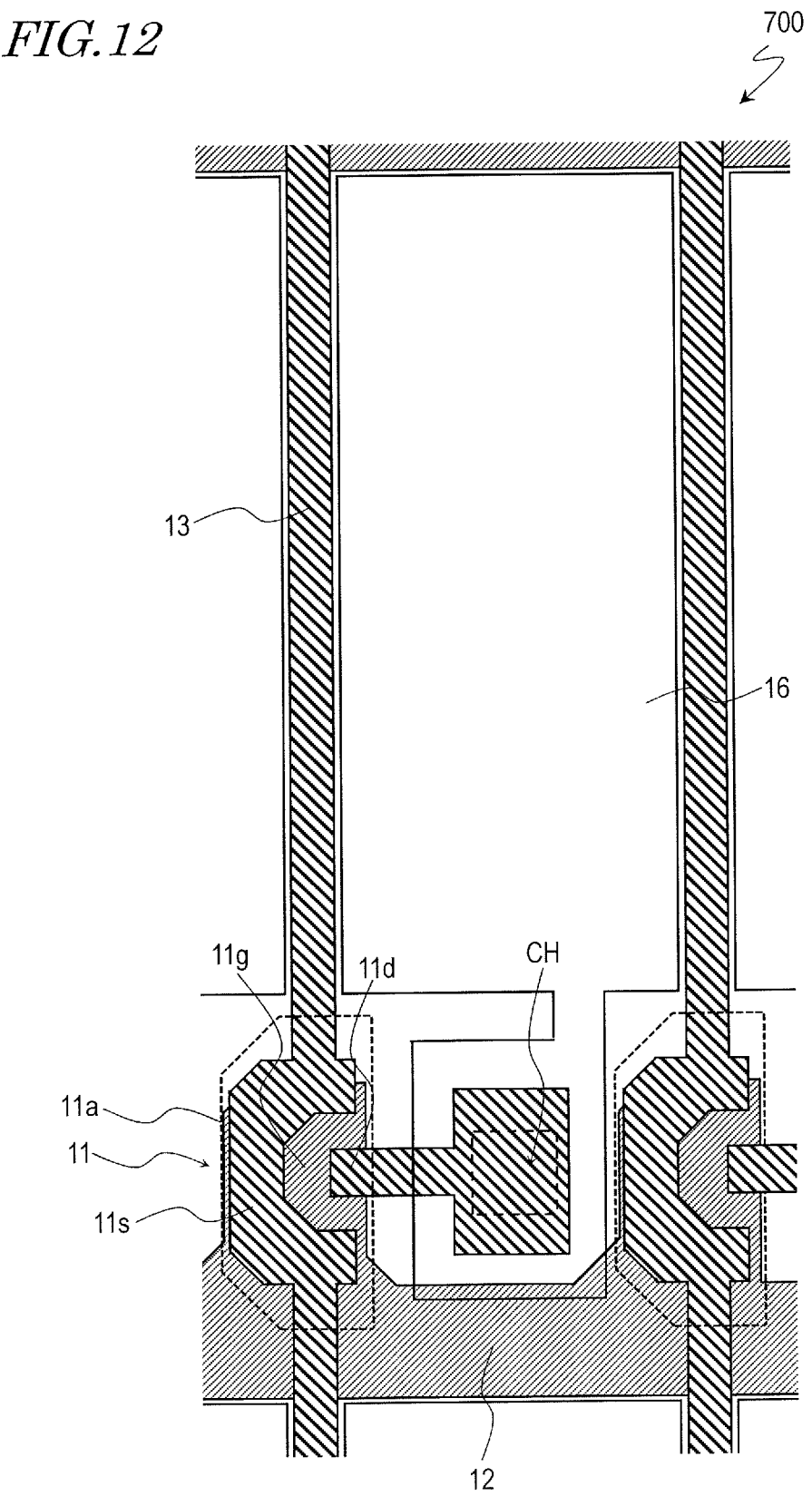
FIG. 12 schematically shows a liquid crystal display device 700 in comparative example 3 and is a plan view showing an area corresponding to one pixel of the liquid crystal display device 700.

FIG. 12 shows a liquid crystal display device 700 in comparative example 3. In the liquid crystal display device 700 in comparative example 3 shown in FIG. 12, the scanning line 12 is not branched, unlike in the liquid crystal display device 200 in this embodiment.

Figure 13:
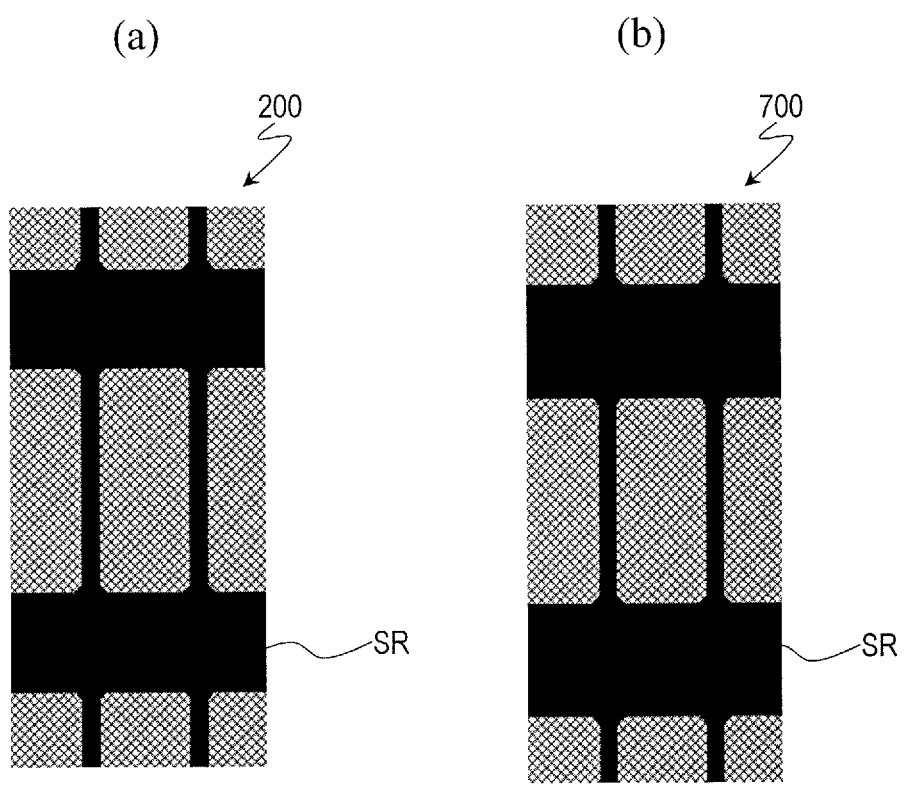
FIGS. 13(a) and (b) respectively show areas SR shielded from light by a light blocking layer in the liquid crystal display device 200 in Embodiment 2 and the liquid crystal display device 700 in comparative example 3.

FIGS. 13(a) and (b) respectively show areas SR shielded from light by the light blocking layer in the liquid crystal display device 200 in this embodiment and the liquid crystal display device 700 in comparative example 3.

As can be seen from comparison between FIGS. 13(a) and (b), the ratio of the area SR shielded from light is smaller and a higher numerical aperture is realized in the liquid crystal display device 200 in this embodiment than in the liquid crystal display device 700 in comparative example 3.

Table 2 below shows an example of numerical aperture values of the liquid crystal display device 200 in this embodiment (Embodiment 2), the liquid crystal display device 700 in comparative example 3, and a conventional liquid crystal display device including an opaque storage capacitor. The pixel size is adjusted to be substantially the same in all the liquid crystal display devices. In the liquid crystal display device 200 in this embodiment and the liquid crystal display device 700 in comparative example 3, the storage capacitor electrode is the transparent storage capacitor electrode 17 formed of a transparent conductive material. By contrast, in the conventional liquid crystal display device, the storage capacitor electrode is an opaque storage capacitor electrode formed of a metal material.

TABLE 2

|  | Embodiment 2 | Comparative example 3 | Conventional |
|---|---|---|---|
| Storage capacitor electrode | Transparent storage capacitor electrode | Transparent storage capacitor electrode | Opaque storage capacitor electrode formed of a metal material |
| Numerical aperture | 1.00 | 0.93 | 0.70 |

As can be seen from Table 2, where the numerical aperture of the liquid crystal display device 200 in this embodiment is 1.00, the numerical aperture of the liquid crystal display device 700 in comparative example 3 is 0.93 and the numerical aperture of the conventional liquid crystal display device is 0.70. Thus, the numerical aperture of the liquid crystal display device 200 in this embodiment is raised by 7.5% as compared with that of the liquid crystal display device 700 in comparative example 3 and is raised by 42.4% as compared with that of the conventional liquid crystal display device.

In the structure shown in this example, the transparent storage capacitor electrode 17 is provided on the first interlayer insulating layer 15, and a storage capacitor is formed of the pixel electrode 16, the transparent storage capacitor electrode 17, and a part of the second interlayer insulating layer 18 that is located between the pixel electrode 16 and the transparent storage capacitor electrode 17. The location of the transparent storage capacitor electrode 17 and the structure of the storage capacitor are not limited to those shown here.

Figure 14:
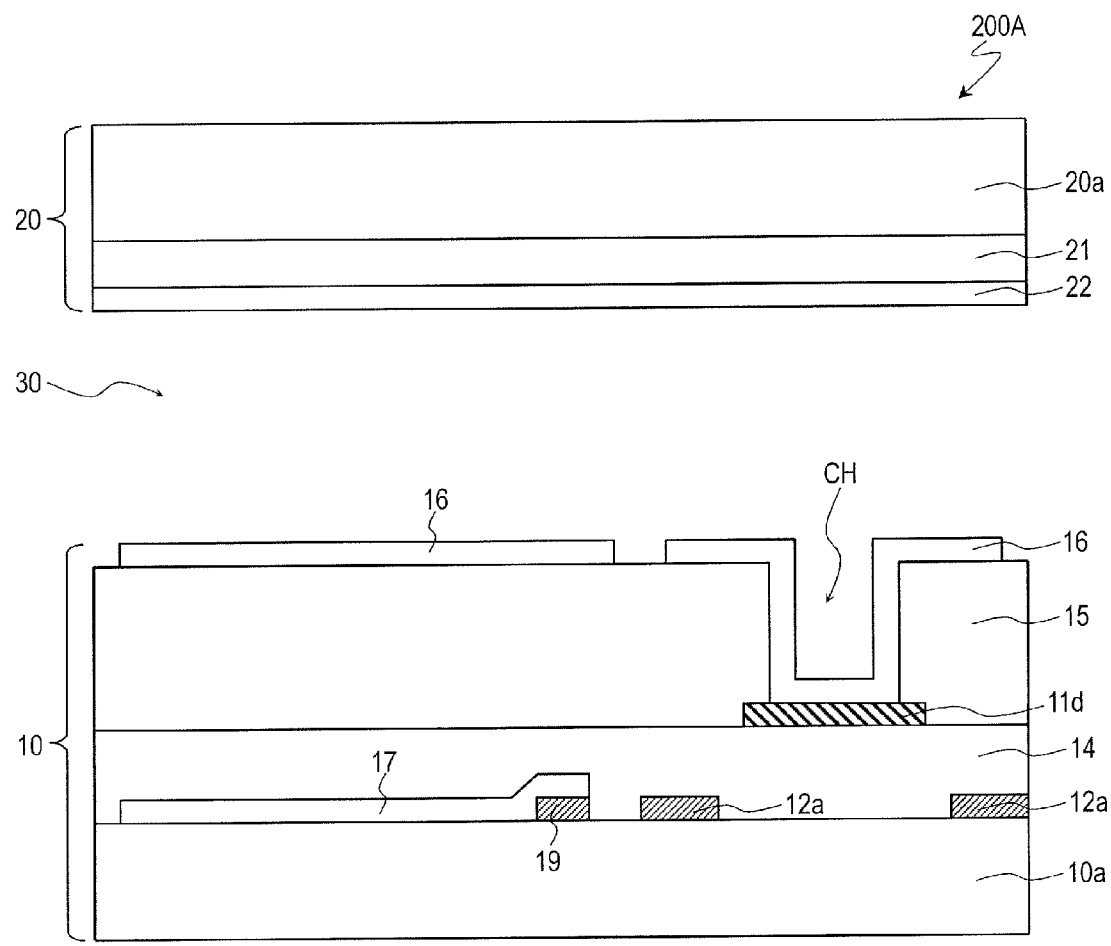
FIG. 14 schematically shows another liquid crystal display device 200A in Embodiment 2 according to the present invention and is a cross-sectional view corresponding to FIG. 10 provided for the liquid crystal display device 200.
Figure 15:
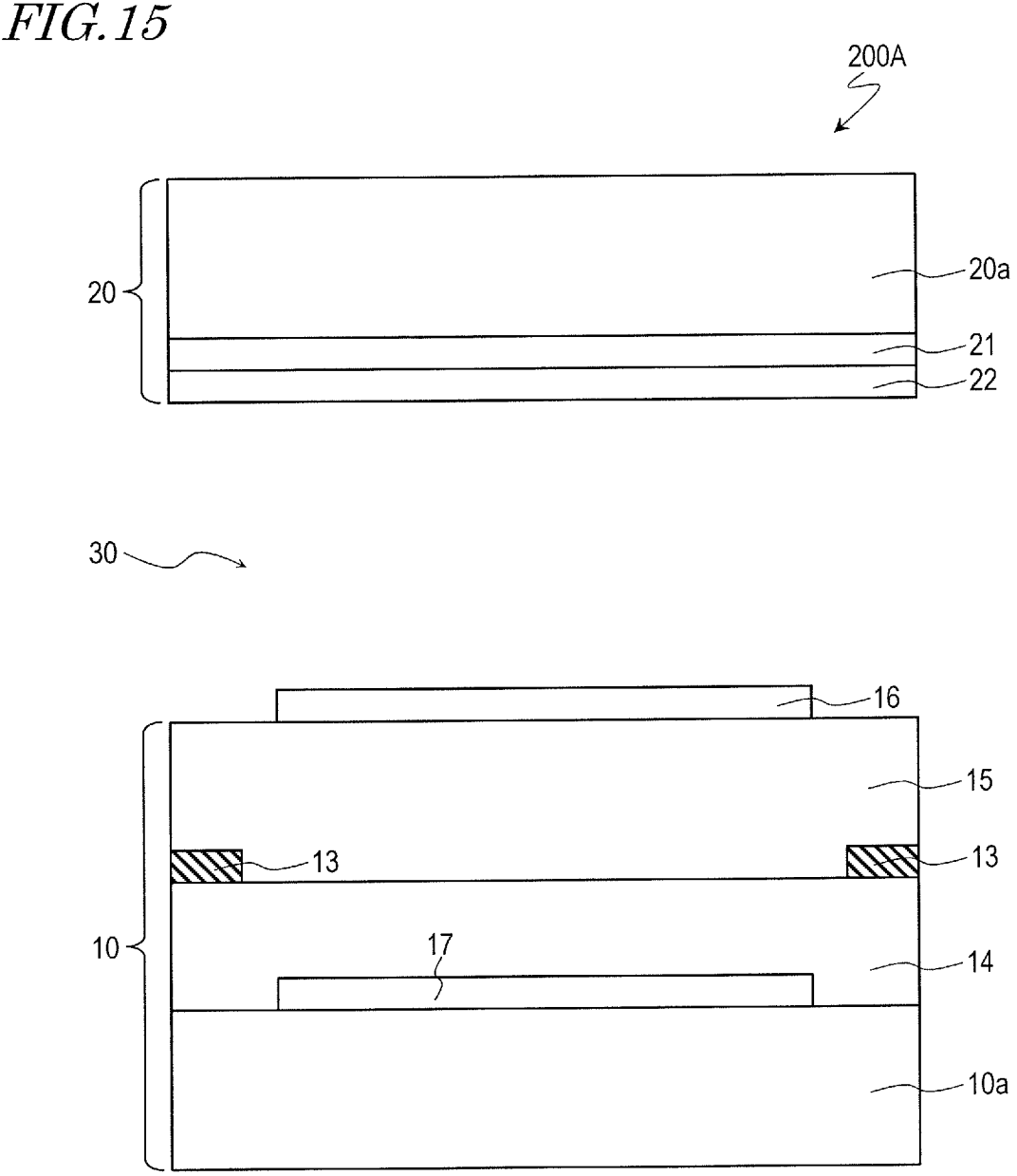
FIG. 15 schematically shows the another liquid crystal display device 200A in Embodiment 2 according to the present invention and is a cross-sectional view corresponding to FIG. 11 provided for the liquid crystal display device 200.

FIG. 14 and FIG. 15 each show another liquid crystal display device 200A in this embodiment. FIG. 14 and FIG. 15 are each a cross-sectional view schematically showing the liquid crystal display device 200A and respectively correspond to FIG. 10 and FIG. 11 provided for the liquid crystal display device 200.

In the liquid crystal display device 200A shown in FIG. 14 and FIG. 15, the transparent storage capacitor electrode 17 is provided below the gate insulating layer 14, and the pixel electrode 16 is provided on the first interlayer insulating layer 15. In this structure, a storage capacitor is formed of the pixel electrode 16, the transparent storage capacitor electrode 17, a part of the gate insulating layer 14, and a part of the first layer insulating layer 15, the parts being located between the pixel electrode 16 and the transparent storage capacitor electrode 17.

The transparent storage capacitor electrode 17 is electrically connected to the storage capacitor line 19 and is supplied with a Cs voltage from the storage capacitor line 19. The storage capacitor line 19 is formed of the same conductive film as that of the scanning line 12. A reason why the transparent storage capacitor electrode 17 is electrically connected to the storage capacitor line 19 is that in the case where the transparent storage capacitor electrode 17 is provided below the gate insulating layer 14, the transparent storage capacitor electrode 17 is patterned so as not to be continuous to expand through all the pixels.

The liquid crystal display device 200A shown in FIG. 14 and FIG. 15 also provides an effect of raising the numerical aperture to a sufficiently high level while suppressing signal delay, which is caused by an increase in the line resistance.

In the structure as in the liquid crystal display device 200 shown in FIG. 10 and FIG. 11, the transparent storage capacitor electrode 17 is located between the scanning line 12/signal line 13 and the pixel electrode 16. Therefore, an electric field formed by a voltage supplied to the scanning line 12 or the signal line 13 can be electrically shielded by the transparent storage capacitor electrode 17. This provides an effect that display can be prevented from being adversely influenced by the potential of the scanning line 12 or the signal line 13.

Embodiment 3

Figure 16:
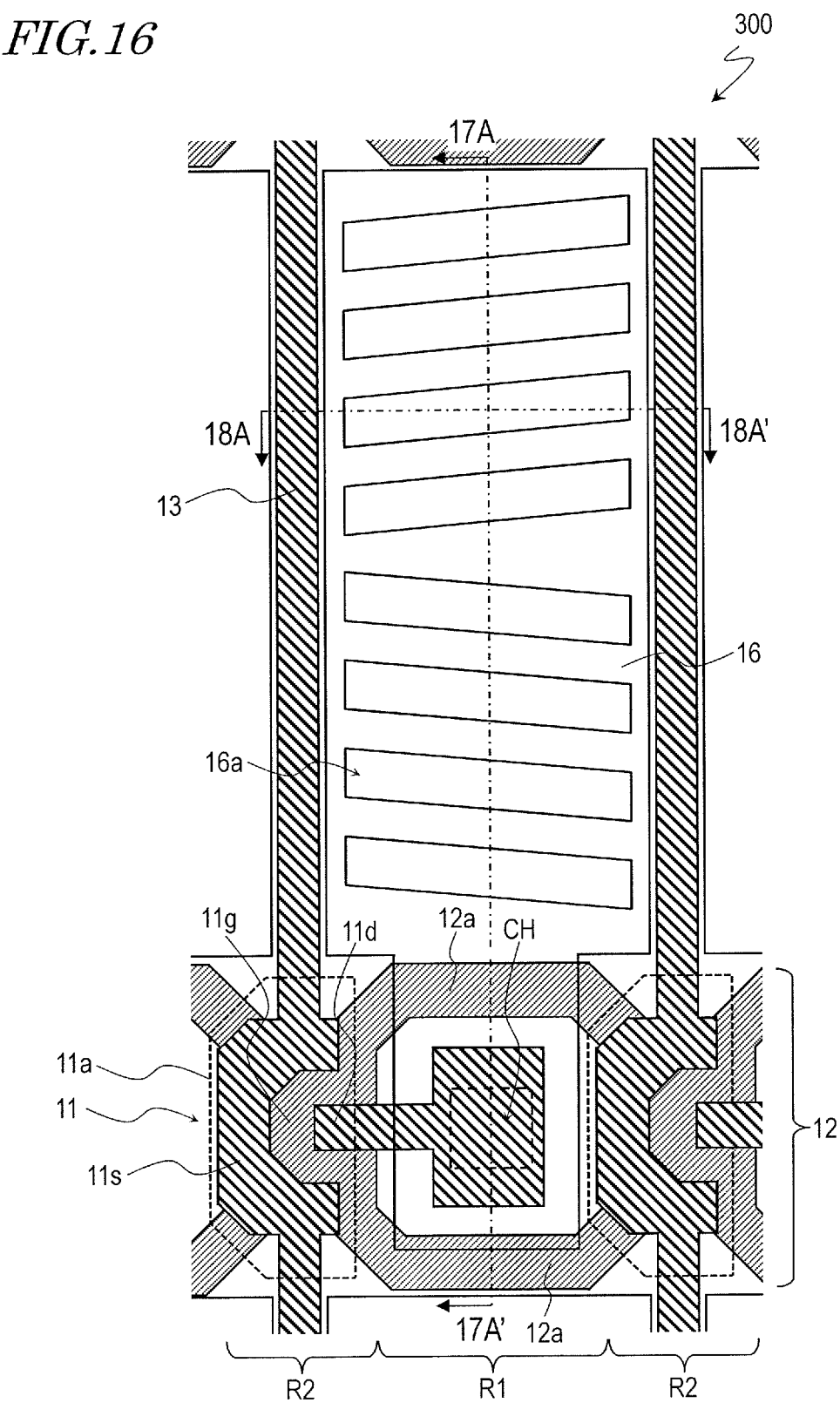
FIG. 16 schematically shows a liquid crystal display device 300 in Embodiment 3 according to the present invention and is a plan view showing an area corresponding to one pixel of the liquid crystal display device 300.
Figure 17:
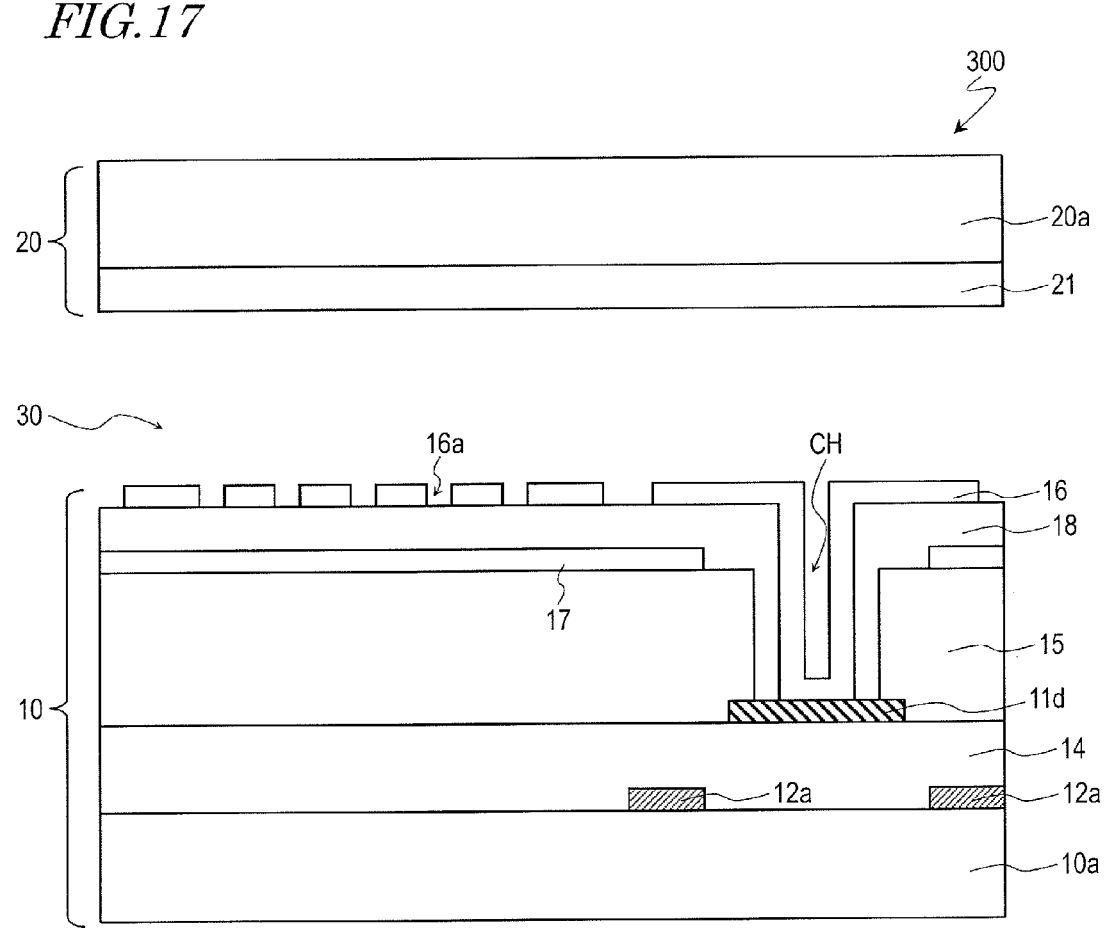
FIG. 17 schematically shows the liquid crystal display device 300 in Embodiment 3 according to the present invention and is a cross-sectional view taken along line 17A-17A' in FIG. 16.
Figure 18:
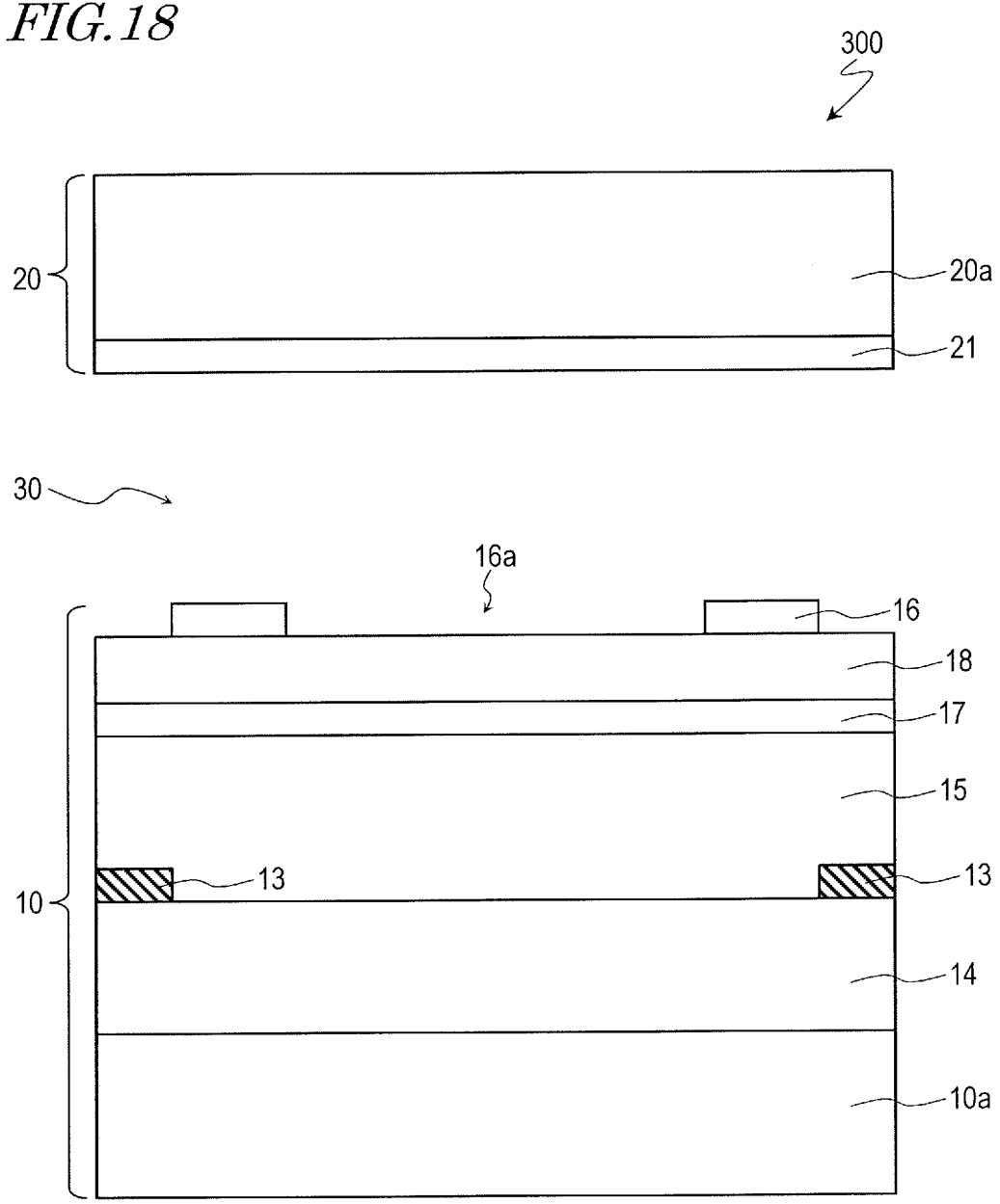
FIG. 18 schematically shows the liquid crystal display device 300 in Embodiment 3 according to the present invention and is a cross-sectional view taken along line 18A-18A' in FIG. 16.

FIG. 16, FIG. 17 and FIG. 18 show a liquid crystal display device 300 in this embodiment. FIG. 16 is a plan view schematically showing an area corresponding to one of pixels in the liquid crystal display device 300. FIG. 17 is a cross-sectional view taken along line 17A-17A' in FIG. 16. FIG. 18 is a cross-sectional view taken along line 18A-18A' in FIG. 16.

The liquid crystal display device 100 in Embodiment 1 provides display in the CPA mode, whereas the liquid crystal display device 300 in this embodiment provides display in a lateral electric field mode. More specifically, the liquid crystal display device 300 in this embodiment provides display in an FSS mode. Therefore, the counter substrate 20 of the liquid crystal display device 300 does not include the counter electrode 20 or the protrusion 23. On the surfaces of the TFT substrate 10 and the counter substrate 20 that face the liquid crystal layer 30 in the liquid crystal display device 300, horizontal alignment films are provided. The pixel electrode 16 in the liquid crystal display device 300 has a plurality of slits 16a formed therein. The transparent storage capacitor electrode 17 also acts as a common electrode. In the liquid crystal layer 30, a lateral electric field is formed in accordance with the potential difference between the pixel electrode 16 and the transparent storage capacitor electrode 17, and the lateral electric field regulates the alignment directions of the liquid crystal molecules. The number and the inclining angle (with respect to the row direction) of the plurality of slits 16a are not limited to those shown in FIG. 16.

In the liquid crystal display device 300 in this embodiment also, the TFT substrate 10 includes the transparent storage capacitor electrode 17, and a storage capacitor is formed of the pixel electrode 16, the transparent storage capacitor electrode 17, and a part of the second interlayer insulating layer 18 that is located between the pixel electrode 16 and the transparent storage capacitor electrode 17. Therefore, the storage capacitor is transparent and does not decrease the numerical aperture.

The scanning line 12 includes the first area R1 in which the scanning line 12 is branched into the two branched lines 12a, and the contact hole CH through which the pixel electrode 16 is electrically connected to the drain electrode 11d is located between the two branched lines 12a. Therefore, the numerical aperture can be further raised while signal delay is suppressed.

Now, specific advantages of the liquid crystal display device 300 in this embodiment will be described as compared with a liquid crystal display device in a comparative example.

Figure 19:
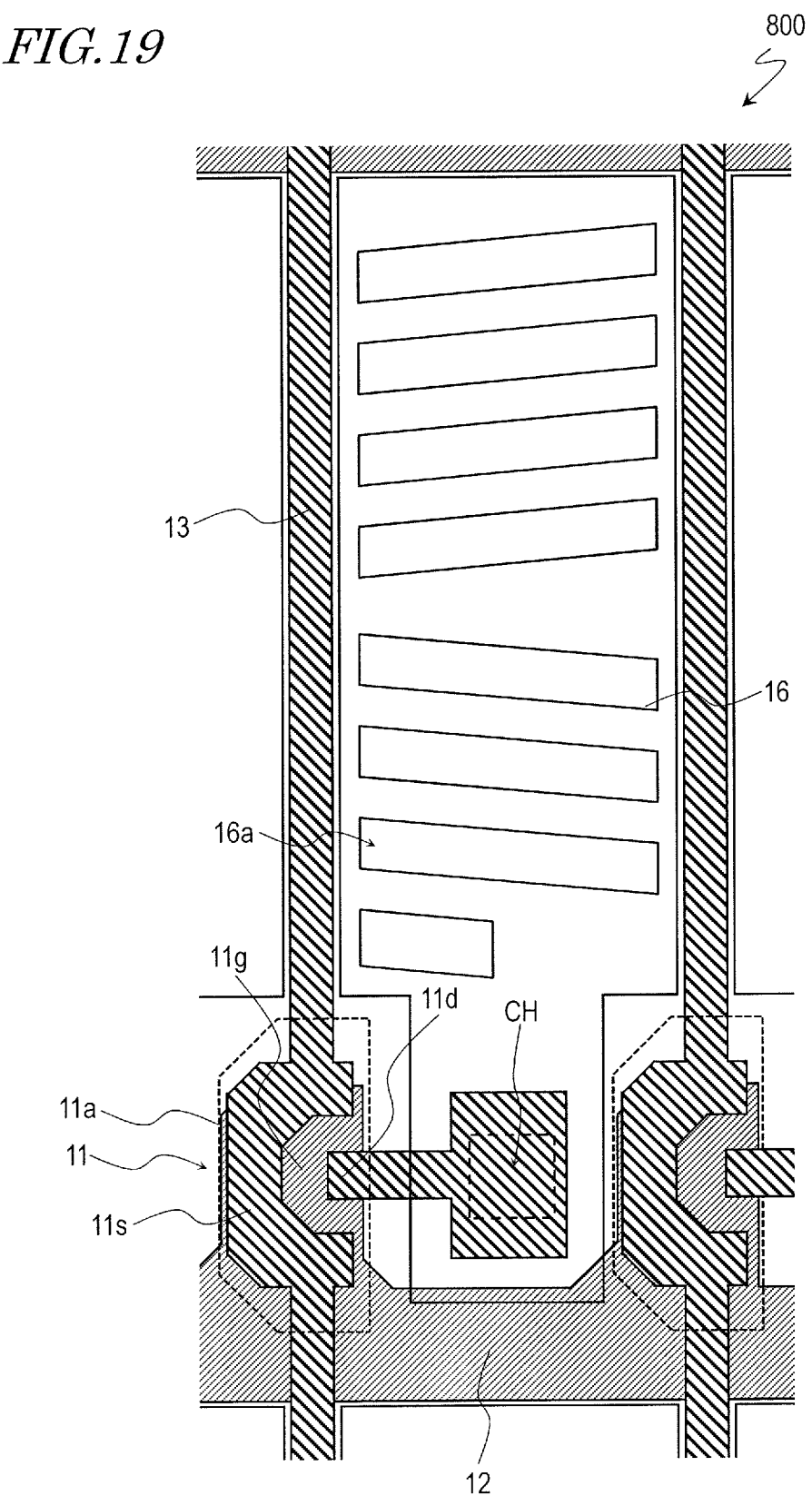
FIG. 19 schematically shows a liquid crystal display device 800 in comparative example 4 and is a plan view showing an area corresponding to one pixel of the liquid crystal display device 800.

FIG. 19 shows a liquid crystal display device 800 in comparative example 4. In the liquid crystal display device 800 in comparative example 4 shown in FIG. 19, the scanning line 12 is not branched, unlike in the liquid crystal display device 300 in this embodiment.

Figure 20:
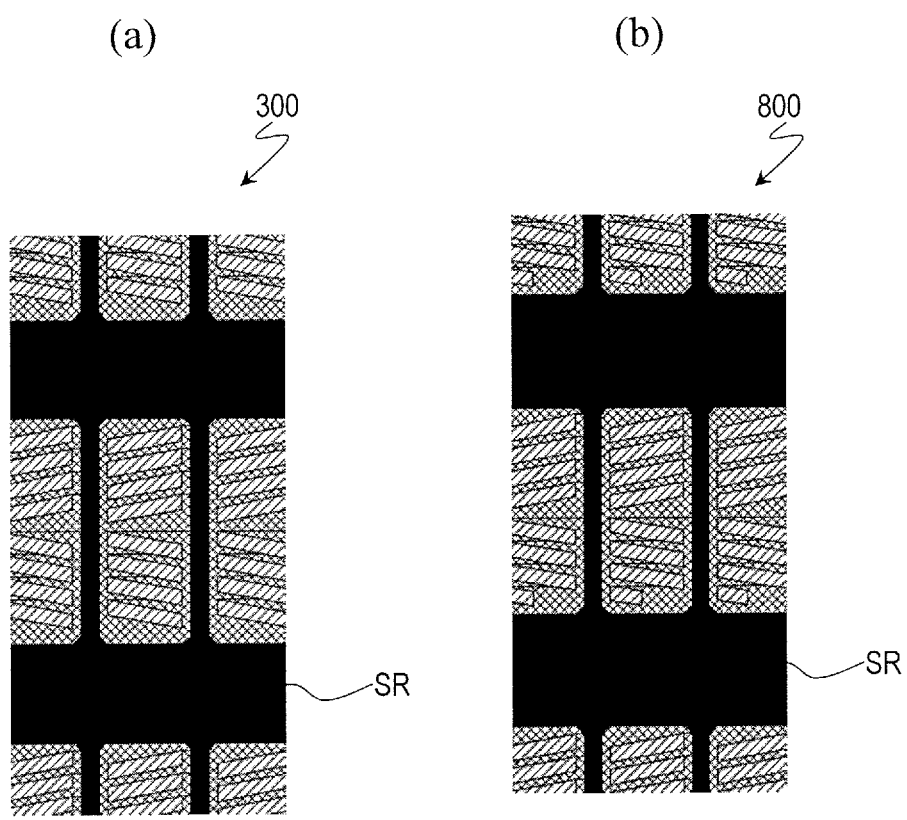
FIGS. 20(a) and (b) respectively show areas SR shielded from light by a light blocking layer in the liquid crystal display device 300 in Embodiment 3 and the liquid crystal display device 800 in comparative example 4.

FIGS. 20(a) and (b) respectively show areas SR shielded from light by the light blocking layer in the liquid crystal display device 300 in this embodiment and the liquid crystal display device 800 in comparative example 4.

As can be seen from comparison between FIGS. 20(a) and (b), the ratio of the area SR shielded from light is smaller and a higher numerical aperture is realized in the liquid crystal display device 300 in this embodiment than in the liquid crystal display device 800 in comparative example 4.

Table 3 below shows an example of numerical aperture values of the liquid crystal display device 300 in this embodiment (Embodiment 3) and the liquid crystal display device 800 in comparative example 4. The pixel size is adjusted to be substantially the same in both of the liquid crystal display devices. In the liquid crystal display device 300 in this embodiment and the liquid crystal display device 800 in comparative example 4, the storage capacitor electrode is the transparent storage capacitor electrode 17 formed of a transparent conductive material.

TABLE 3

|  | Embodiment 3 | Comparative example 4 |
| --- | --- | --- |
| Storage capacitor electrode | Transparent storage capacitor electrode | Transparent storage capacitor electrode |
| Numerical aperture | 1.00 | 0.93 |

As can be seen from Table 3, where the numerical aperture of the liquid crystal display device 300 in this embodiment is 1.00, the numerical aperture of the liquid crystal display device 800 in comparative example 4 is 0.93. Thus, the numerical aperture of the liquid crystal display device 300 in this embodiment is raised by 7.5% as compared with that of the liquid crystal display device 800 in comparative example 4.

In the structure shown in this example, the transparent storage capacitor electrode 17 is provided on the first interlayer insulating layer 15, and a storage capacitor is formed of the pixel electrode 16, the transparent storage capacitor electrode 17, and a part of the second interlayer insulating layer 18 that is located between the pixel electrode 16 and the transparent storage capacitor electrode 17. The location of the transparent storage capacitor electrode 17 and the structure of the storage capacitor are not limited to those shown here.

Figure 21:
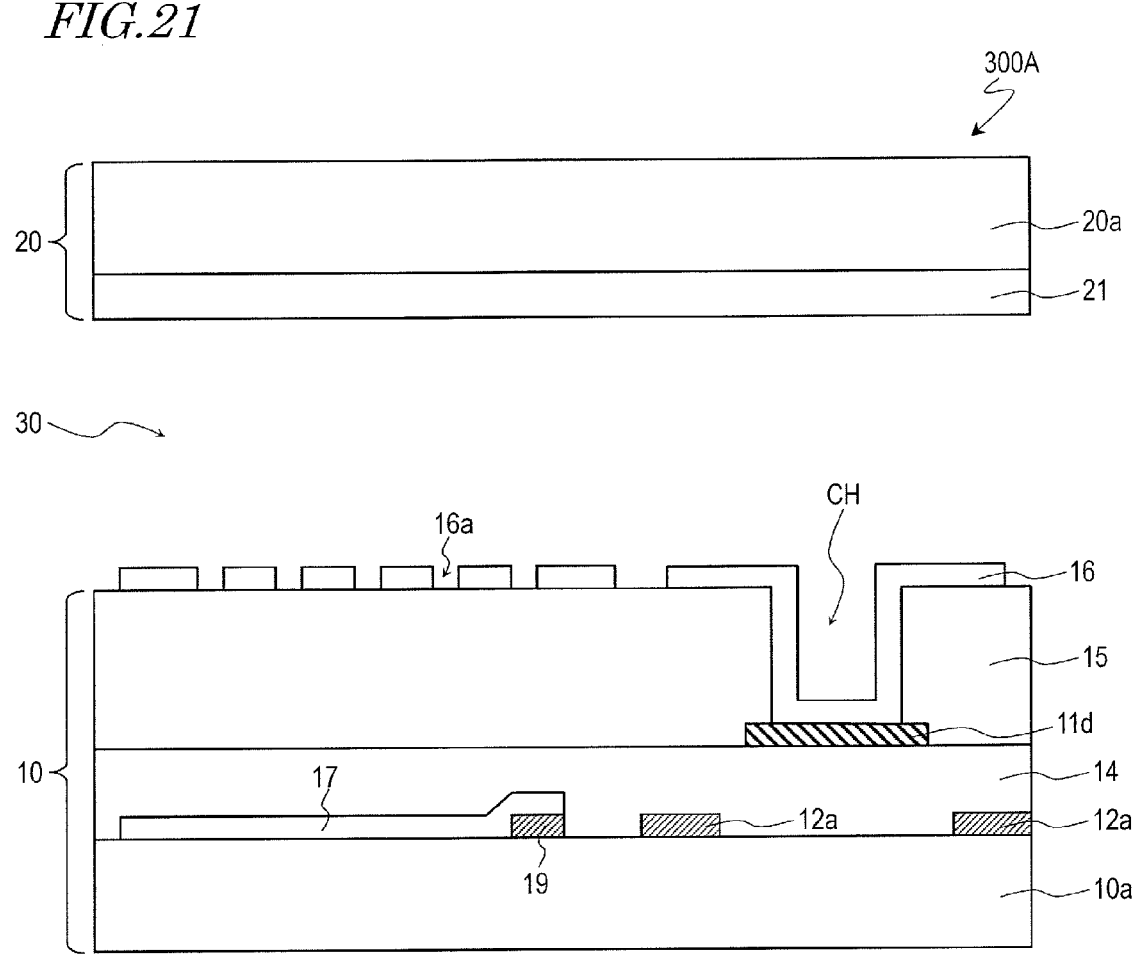
FIG. 21 schematically shows another liquid crystal display device 300A in Embodiment 3 according to the present invention and is a cross-sectional view corresponding to FIG. 17 provided for the liquid crystal display device 300.
Figure 22:
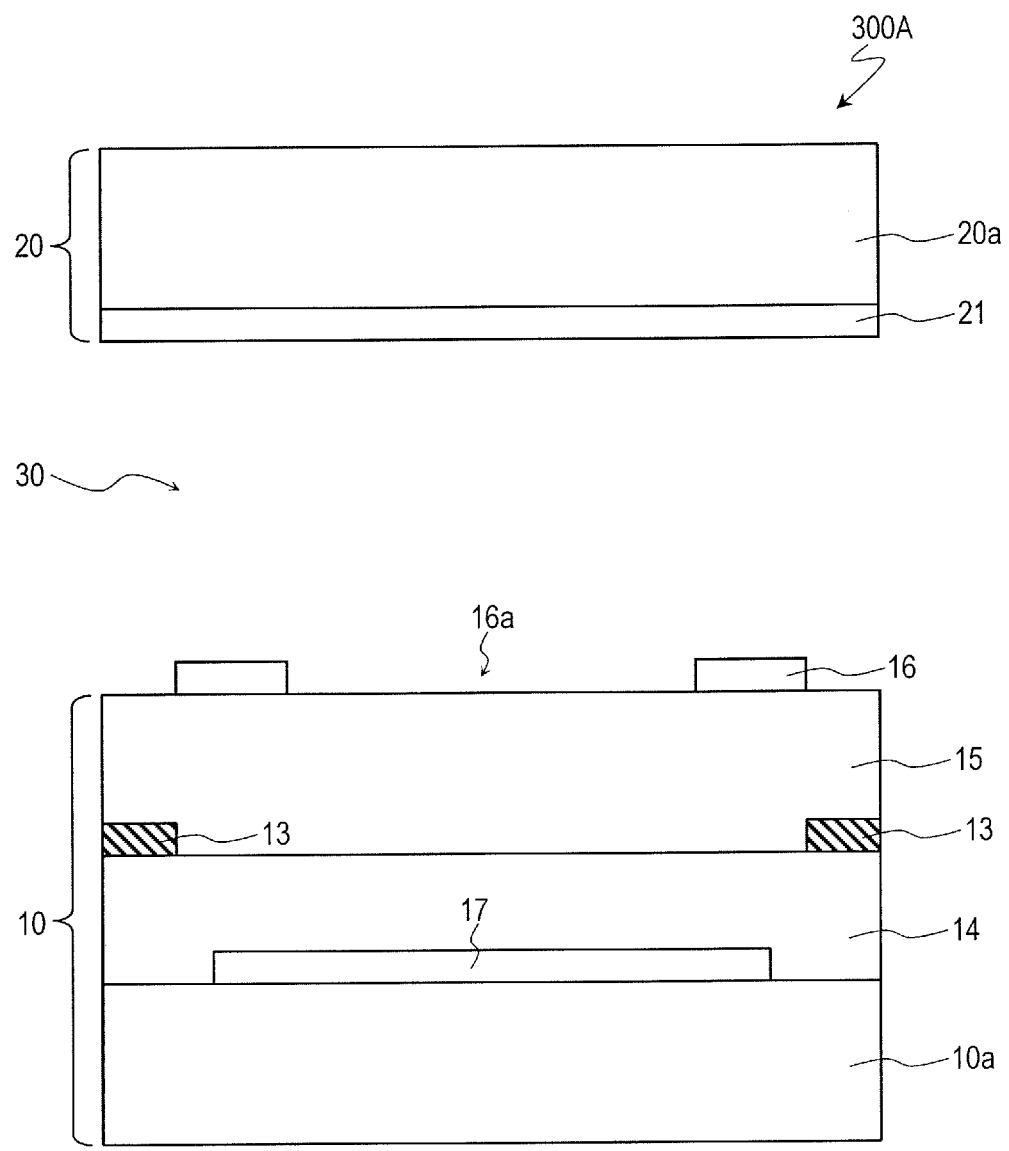
FIG. 22 schematically shows the another liquid crystal display device 300A in Embodiment 3 according to the present invention and is a cross-sectional view corresponding to FIG. 18 provided for the liquid crystal display device 300.

FIG. 21 and FIG. 22 each show another liquid crystal display device 300A in this embodiment. FIG. 21 and FIG. 22 are each a cross-sectional view schematically showing the liquid crystal display device 300A and respectively correspond to FIG. 17 and FIG. 18 provided for the liquid crystal display device 300.

In the liquid crystal display device 300A, shown in FIG. 21 and FIG. 22, the transparent storage capacitor electrode 17 is provided below the gate insulating layer 14, and the pixel electrode 16 is provided on the first interlayer insulating layer 15. In this structure, a storage capacitor is formed of the pixel electrode 16, the transparent storage capacitor electrode 17, a part of the gate insulating layer 14, and a part of the first layer insulating layer 15, the parts being located between the pixel electrode 16 and the transparent storage capacitor electrode 17.

The transparent storage capacitor electrode 17 is electrically connected to the storage capacitor line 19 and is supplied with a Cs voltage from the storage capacitor line 19. The storage capacitor line 19 is formed of the same conductive film as that of the scanning line 12. A reason why the transparent storage capacitor electrode 17 is electrically connected to the storage capacitor line 19 is that in the case where the transparent storage capacitor electrode 17 is provided below the gate insulating layer 14, the transparent storage capacitor electrode 17 is patterned so as not to be continuous to expand through all the pixels.

The liquid crystal display device 300A shown in FIG. 21 and FIG. 22 also provides an effect of raising the numerical aperture to a sufficiently high level while suppressing signal delay, which is caused by an increase in the line resistance.

Figure 23:
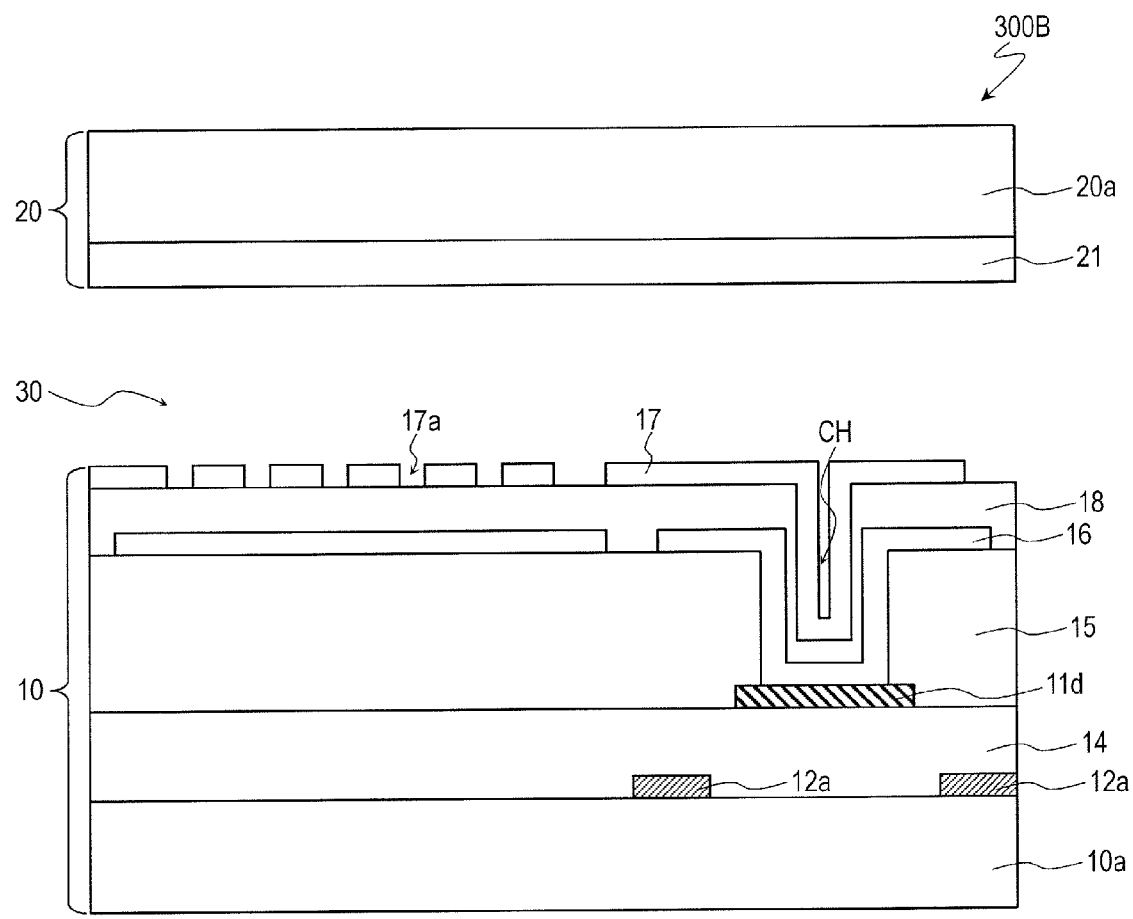
FIG. 23 schematically shows still another liquid crystal display device 300B in Embodiment 3 according to the present invention and is a cross-sectional view corresponding to FIG. 17 provided for the liquid crystal display device 300.
Figure 24:
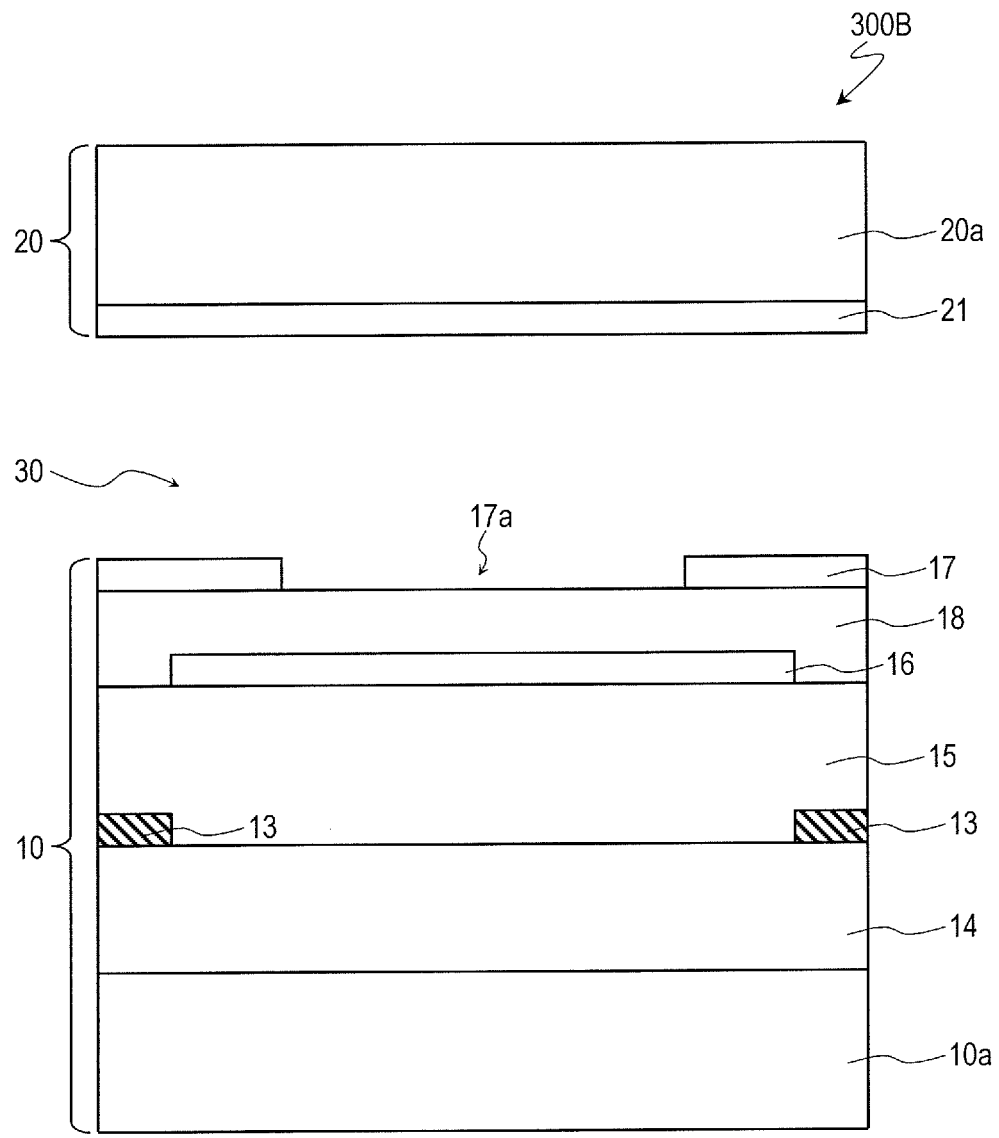
FIG. 24 schematically shows the still another liquid crystal display device 300B in Embodiment 3 according to the present invention and is a cross-sectional view corresponding to FIG. 18 provided for the liquid crystal display device 300.

FIG. 23 and FIG. 24 each show still another liquid crystal display device 300B in this embodiment. FIG. 23 and FIG. 24 are each a cross-sectional view schematically showing the liquid crystal display device 300B and respectively correspond to FIG. 17 and FIG. 18 provided for the liquid crystal display device 300.

In the liquid crystal display device 300B shown in FIG. 23 and FIG. 24, the pixel electrode 16 is provided on the first interlayer insulating layer 15, and the transparent storage capacitor electrode 17 is provided on the second interlayer insulating layer 18, which is provided so as to cover the pixel electrode 16.

In this structure, a storage capacitor is formed of the pixel electrode 16, the transparent storage capacitor electrode 17, and a part of the second interlayer insulating layer 18 that is located between the pixel electrode 16 and the transparent storage capacitor electrode 17. In this embodiment, the pixel electrode 16 does not have the plurality of slits 16a, whereas the transparent storage capacitor electrode 17 has a plurality of slits 17a formed therein.

The liquid crystal display device 300B shown in FIG. 23 and FIG. 24 also provides an effect of raising the numerical aperture to a sufficiently high level while suppressing signal delay, which is caused by an increase in the line resistance.

In the structure as in the liquid crystal display device 300 shown in FIG. 17 and FIG. 18, the transparent storage capacitor electrode 17 is located between the scanning line 12/signal line 13 and the pixel electrode 16. Therefore, an electric field formed by a voltage supplied to the scanning line 12 or the signal line 13 can be electrically shielded by the transparent storage capacitor electrode 17. This provides an effect that display can be prevented from being adversely influenced by the potential of the scanning line 12 or the signal line 13.

INDUSTRIAL APPLICABILITY

Embodiments of the present invention provide a liquid crystal display device which can realize a sufficiently high numerical aperture even if the resolution is high and an active matrix substrate preferably usable in such a liquid crystal display device. A liquid crystal display device in embodiments according to the present invention is preferably usable as a liquid crystal display device of each of various modes including the VA mode, the lateral electric field mode, the TN mode, the ECB mode and the like.

REFERENCE SIGNS LIST

10 Active matrix substrate (TFT substrate)
10a Substrate
11 Thin film transistor (TFT)
11a Semiconductor layer
11g Gate electrode 11s Source electrode
11d Drain electrode
11d' Connection electrode
12 Scanning line (source bus line)
13 Signal line (gate bus line)
14 Gate insulating layer
15 First interlayer insulating layer
16 Pixel electrode
16a Slit
17 Transparent storage capacitor electrode
17a Slit
18 Second interlayer insulating layer
19 Storage capacitor line
20 Counter substrate (color filter substrate)
20a Substrate
21 Color filter layer
22 Counter electrode
23 Protrusion
30 Liquid crystal layer
100, 100A, 200, 200A, 300, 300A, 300B Liquid crystal display device
CH Contact hole

The invention claimed is:

1. An active matrix substrate, comprising:
a substrate;
a thin film transistor that is supported by the substrate and includes a semiconductor layer, a gate electrode, a source electrode and a drain electrode;
a scanning line electrically connected to the gate electrode of the thin film transistor;
a signal line electrically connected to the source electrode of the thin film transistor;
a first interlayer insulating layer that covers the thin film transistor;
a pixel electrode electrically connected to the drain electrode of the thin film transistor; and
a transparent storage capacitor electrode that includes a transparent conductive material and overlaps a portion of the pixel electrode when viewed in a direction normal to the substrate; wherein:
at least the first interlayer insulating layer includes a contact hole through which the pixel electrode is electrically connected to the drain electrode;
the scanning line includes a first area in which the scanning line is branched into two branched lines;
the contact hole is between the two branched lines; and
the scanning line surrounds the contact hole on all sides when viewed in the direction normal to the substrate.

2. The active matrix substrate of claim 1, wherein:
the scanning line includes the first area and a second area in which the scanning line is not branched into two branched lines, the first area and the second area being located alternately in a direction in which the scanning line extends; and
the thin film transistor is located so as to partially overlap the second area of the scanning line.

3. The active matrix substrate of claim 1, wherein:
the transparent storage capacitor electrode is provided on the first interlayer insulating layer;
the active matrix substrate further includes a second interlayer insulating layer provided so as to cover the transparent storage capacitor electrode;
the pixel electrode is provided on the second interlayer insulating layer; and
the contact hole passes through both of the first interlayer insulating layer and the second interlayer insulating layer.

4. The active matrix substrate of claim 3, wherein a storage capacitor is defined by the pixel electrode, the transparent storage capacitor electrode, and a portion of the second interlayer insulating layer that is located between the pixel electrode and the transparent storage capacitor electrode.

5. The active matrix substrate of claim 1, further comprising a gate insulating layer provided so as to cover the gate electrode; wherein:
the transparent storage capacitor electrode is provided below the gate insulating layer; and
the pixel electrode is provided on the first interlayer insulating layer.

6. The active matrix substrate of claim 5, wherein a storage capacitor is defined by the pixel electrode, the transparent storage capacitor electrode, a portion of the gate insulating layer, and a portion of the first interlayer insulating layer, the portion of the gate insulating layer and the portion of the first insulating layer being located between the pixel electrode and the transparent storage capacitor electrode.

7. The active matrix substrate of claim 1, wherein:
the pixel electrode is provided on the first interlayer insulating layer;
the active matrix substrate further includes a second interlayer insulating layer provided so as to cover the pixel electrode; and
the transparent storage capacitor electrode is provided on the second interlayer insulating layer.

8. The active matrix substrate of claim 7, wherein a storage capacitor is defined by the pixel electrode, the transparent storage capacitor electrode, and a portion of the second interlayer insulating layer that is located between the pixel electrode and the transparent storage capacitor electrode.

9. A liquid crystal display device, comprising:
the active matrix substrate of claim 1;
a counter substrate located so as to face the active matrix substrate; and
a liquid crystal layer provided between the active matrix substrate and the counter substrate.

10. A liquid crystal display device, comprising:
the active matrix substrate of claim 1;
a counter substrate located so as to face the active matrix substrate; and
a liquid crystal layer provided between the active matrix substrate and the counter substrate; wherein
the liquid crystal display device provides display in a lateral electric field mode.

11. The liquid crystal display device of claim 10, wherein:
the transparent storage capacitor electrode acts as a common electrode; and
the pixel electrode or the transparent storage capacitor electrode includes a plurality of slits provided therein.

12. A liquid crystal display device, comprising:
the active matrix substrate of claim 1;
a counter substrate located so as to face the active matrix substrate; and
a liquid crystal layer provided between the active matrix substrate and the counter substrate; wherein
the liquid crystal display device provides display in a vertical alignment mode.

13. The liquid crystal display device of claim 9, wherein the counter substrate includes a light blocking layer overlapping at least the contact hole.

* * * * *